United States Patent
Park et al.

(10) Patent No.: US 12,199,450 B2
(45) Date of Patent: Jan. 14, 2025

(54) SYSTEM AND METHOD FOR FOREIGN OBJECT DETECTION IN WIRELESS POWER TRANSFER

(71) Applicant: KOREA ELECTRONICS TECHNOLOGY INSTITUTE, Seongnam-si (KR)

(72) Inventors: Yong Ju Park, Goyang-si (KR); Yong Seok Lim, Seoul (KR); Yong Seong Kim, Goyang-si (KR); Hae Yong Jung, Bucheon-si (KR); Hye Jung Kim, Incheon (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/058,688

(22) Filed: Nov. 23, 2022

(65) Prior Publication Data
US 2023/0387725 A1  Nov. 30, 2023

(30) Foreign Application Priority Data
May 27, 2022 (KR) .......................... 10-2022-0065096

(51) Int. Cl.
*G01C 3/08* (2006.01)
*G01V 8/18* (2006.01)
*H02J 50/12* (2016.01)
*H02J 50/60* (2016.01)

(52) U.S. Cl.
CPC ................ *H02J 50/60* (2016.02); *G01V 8/18* (2013.01); *H02J 50/12* (2016.02)

(58) Field of Classification Search
CPC ............ H02J 50/60; H02J 50/12; H02J 50/10; G01V 8/18; G01V 3/08; G01R 17/02; G01R 19/0084; G01R 19/10; G01R 19/30
See application file for complete search history.

(56) References Cited

U.S. PATENT DOCUMENTS

| | | | | |
|---|---|---|---|---|
| 6,029,893 | A * | 2/2000 | Tan | G06K 7/10702 235/462.34 |
| 2014/0339905 | A1* | 11/2014 | Moritsuka | B60L 53/36 307/104 |
| 2021/0333562 | A1* | 10/2021 | Chae | G02B 27/0176 |
| 2021/0334991 | A1* | 10/2021 | Lee | G03B 21/00 |
| 2022/0035078 | A1* | 2/2022 | Cramer | G02B 27/0905 |

* cited by examiner

*Primary Examiner* — Samantha K Nickerson
(74) *Attorney, Agent, or Firm* — Knobbe, Martens, Olson, & Bear, LLP

(57) ABSTRACT

A system for foreign object detection (FOD) in wireless power transfer is proposed. The system may include a balanced coil which is disposed between a transmitter coil and a receiver coil and which includes a Maxwell bridge circuit. The system may also include a temperature sensor configured to measure a temperature of the transmitter coil. The system may further include a processor configured to determine whether an FO is present between the transmitter coil and the receiver coil on the basis of voltage values detected at both ends of the bridge circuit. The FOD system can recognize the FO by finding a maximum resonant frequency at which a metal reacts using resonant frequency sweeping in a bridge circuit.

3 Claims, 51 Drawing Sheets

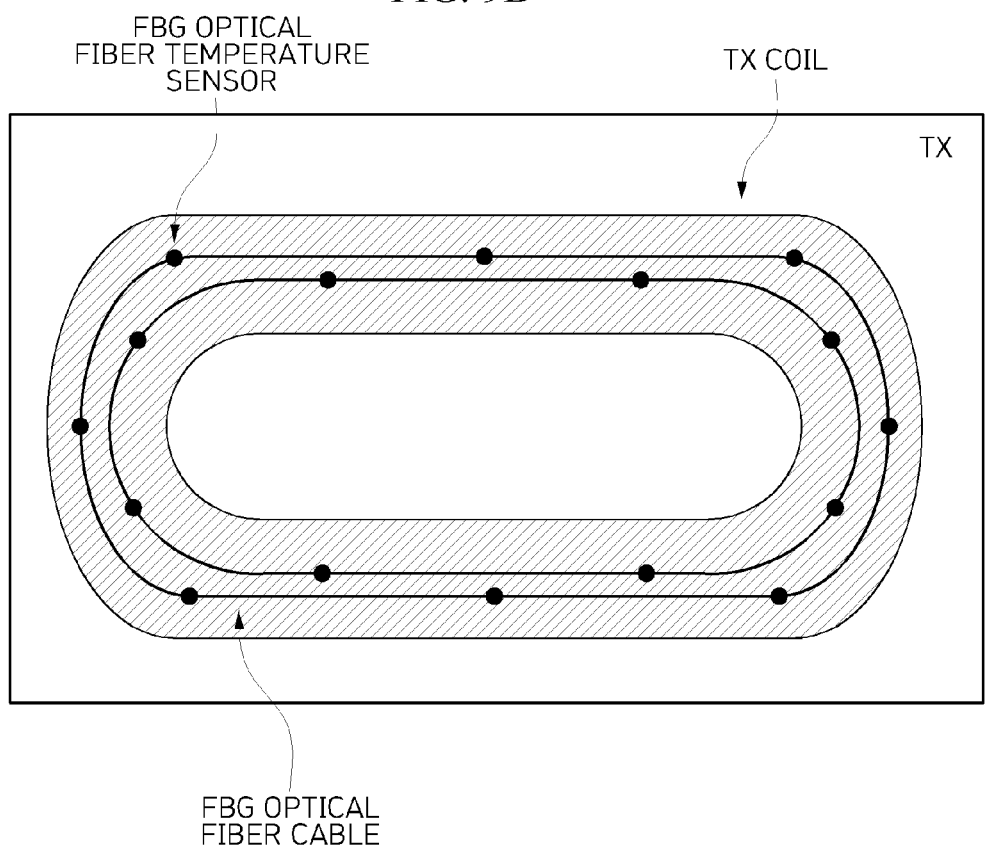

TOP VIEW
(TRANSMITTER + BALANCED COIL)

FIG. 19
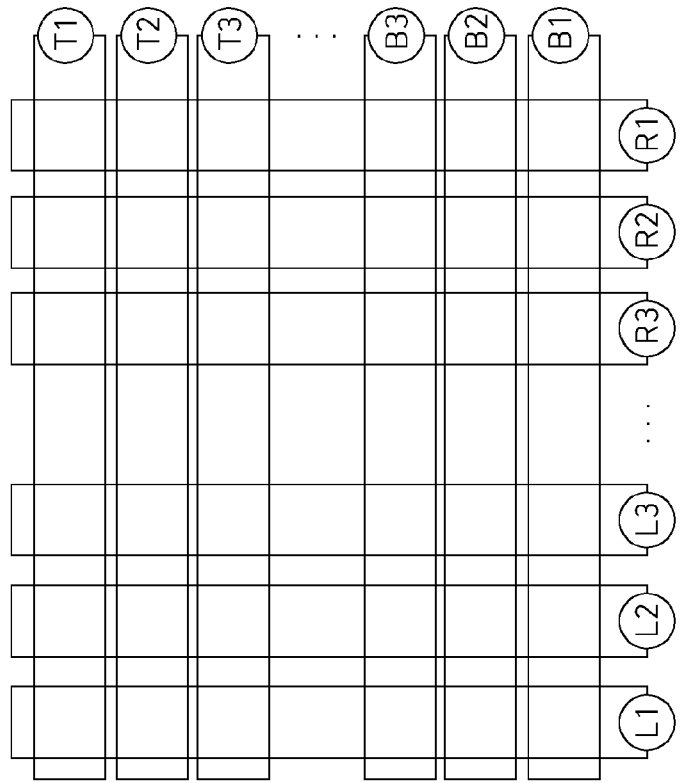
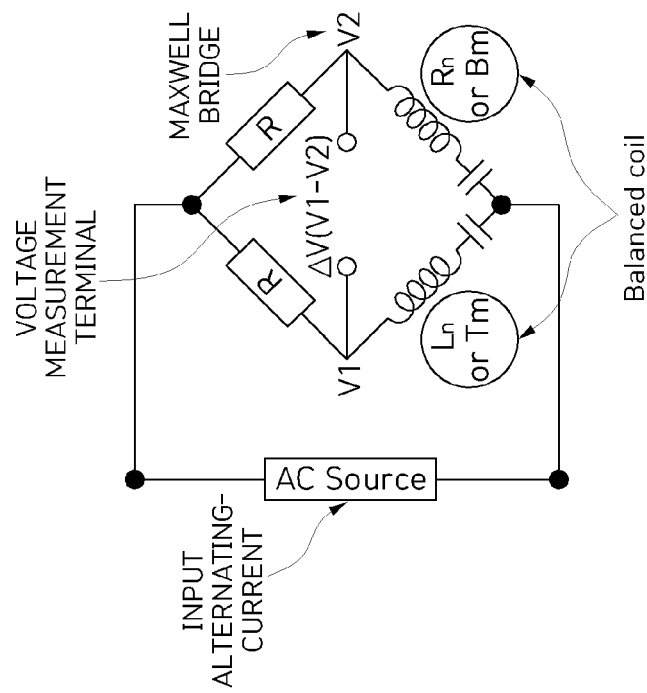

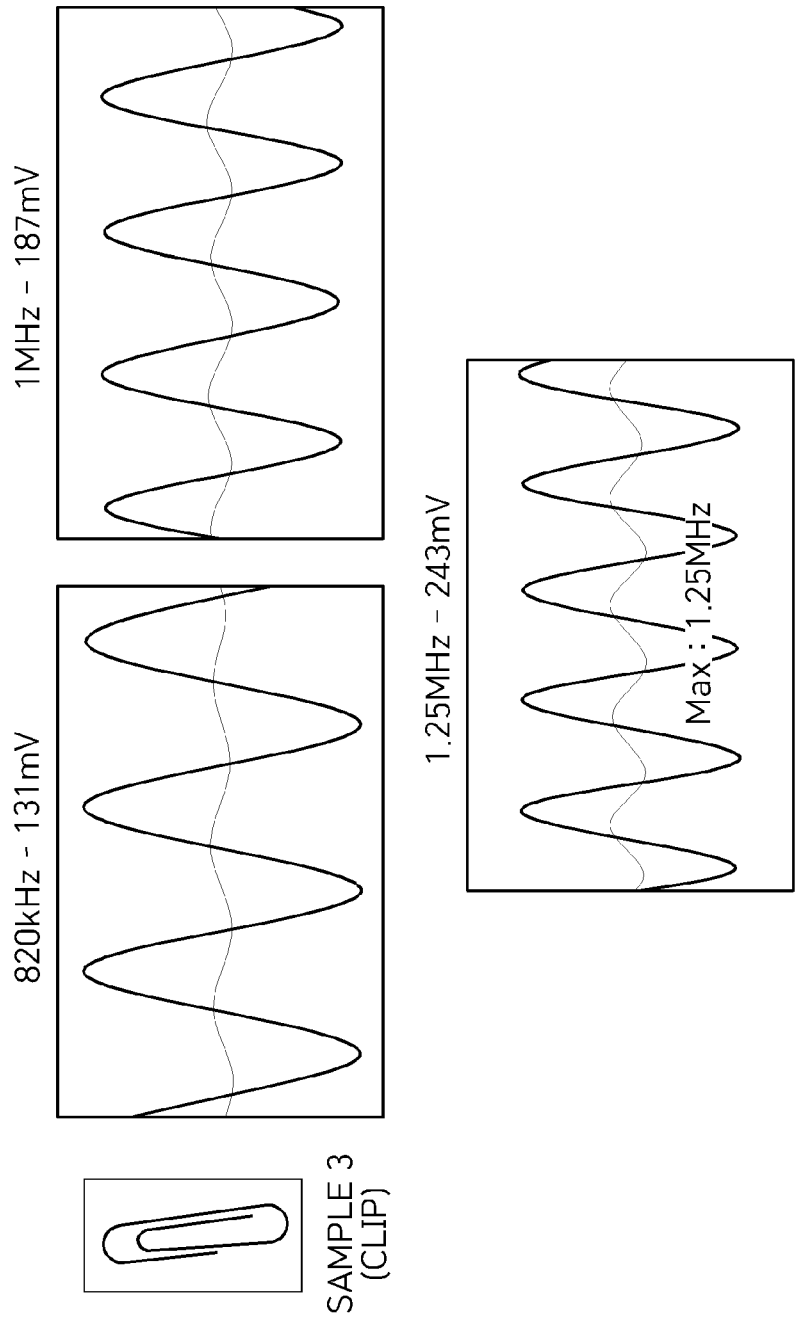

INSERTION OF FOREIGN
OBJECT IN MULTI-LINE PATTERN

INSERTION OF FOREIGN
OBJECT IN 2D PATTERN

2D PATTERN

MIS-ALIGNMENT

WIRELESS CHARGING Tx COIL

SYSTEM AND METHOD FOR FOREIGN OBJECT DETECTION IN WIRELESS POWER TRANSFER

CROSS-REFERENCE TO RELATED APPLICATION

This application claims priority to and the benefit of Korean Patent Application No. 10-2022-0065096, filed on May 27, 2022, the disclosure of which is incorporated herein by reference in its entirety.

BACKGROUND

Technical Field

The present disclosure relates to a system and a method for foreign object detection (FOD) in wireless power transfer.

Discussion of Related Technology

When metallic foreign objects (FOs) are present between a power transmitter TX and a power receiver RX for wireless power transfer, due to impedance mismatch, a coil of the transmitter TX may be overheated so that circuit damage may occur and a problem in system stability may occur. In particular, an electric vehicle wireless charging system required high output so that heating of a coil may lead to heating of the entire system. In addition to the metallic FOs, the presence of living objects (LOs) may pose a threat to life. For this reason, a foreign object detection (FOD) technology is an essential technology for wireless charging products.

SUMMARY

The present disclosure is directed to providing a foreign object detection (FOD) method and an FOD system which are not affected by types or sizes of foreign objects (FOs) in wireless power transfer.

In addition, the present disclosure is also directed to providing an FOD method and an FOD system in a wireless power transfer system, in which reliability and accuracy are improved by performing appropriate correction of a balanced coil according to a temperature change.

In addition, the present disclosure is also directed to providing an FOD method capable of detecting even a small amount of change in value of the inductance L for optimal FOD in a wireless charging transmission/reception environment in which a constant separation distance is present.

In addition, the present disclosure is also directed to providing a metal detection method capable of shifting a resonant frequency. In particular, the present disclosure is directed to providing a metal detection method using a balanced coil structure which is changed by metallic FOs, and resonant frequency sweeping to respond to metals of various shapes, sizes, and materials in the balanced coil structure.

Meanwhile, an optic-based detection method using the existing camera is very sensitive to an environment such as illuminance so that it is impossible to recognize an object in low illuminance. In addition, when a two-dimensional (2D)-based camera is used, it is very difficult to analyze a three-dimensional shape of an object. For these reasons, there is a disadvantage in that it is difficult to analyze a shape of the object, such as a size and a height.

Accordingly, the present disclosure is also directed to providing a technology which is very robust to environments such as illumination and temperature and is capable of simultaneous performing metallic object detection (MOD) and living object detection (LOD) in a wireless power transfer system in which power transmission and reception terminals are separated.

According to the present disclosure, a method of detecting foreign objects (FOs) by configuring a balanced coil as a Maxwell bridge circuit and detecting the amount of change in voltage applied across both ends of the Maxwell bridge circuit instead of a method of detecting a change in inductance of the balanced coil, thereby detecting FOs, is newly proposed.

In addition, according to the present disclosure, an FOD method and an FOD system, in which an optical fiber sensor is applied (embedded) in a primary coil, is proposed.

According to an aspect of the present disclosure, there is provided an FOD system in a wireless power transfer system, which includes a balanced coil which is disposed between a transmitter coil and a receiver coil and which includes a Maxwell bridge circuit, a processor configured to determine whether an FO is present between the transmitter coil and the receiver coil on the basis of voltage values detected at both ends of the bridge circuit.

The balanced coil may include a plurality of unit coils disposed in a lateral direction and a plurality of unit coils disposed in a longitudinal direction, and each unit coil may be formed to be symmetrically paired with another unit coil.

The symmetrically paired unit coils may be configured to have the same induced voltage value.

According to another aspect of the present disclosure, there is provided an FOD system in a wireless power transfer system, which includes a balanced coil which is disposed between a transmitter coil and a receiver coil and which includes a Maxwell bridge circuit, a temperature sensor configured to measure a temperature of the transmitter coil, and a processor configured to determine whether an FO is present between the transmitter coil and the receiver coil on the basis of voltage values detected at both ends of the bridge circuit.

The temperature sensor may be a fiber Bragg grating (FBG) optical fiber temperature sensor and may be embedded in a balanced coil printed circuit board (PCB) or a transmitter coil.

The processor may correct a change in voltage value detected at both ends of the bridge circuit according to a temperature change of the transmitter coil on the basis of a temperature measured by the temperature sensor and may determine whether the FO is present on the basis of the corrected voltage value.

According to still another aspect of the present disclosure, there is provided an FOD system in a wireless power transfer system, which includes a temperature sensor configured to measure a temperature of a transmitter coil, and a processor configured to determine whether an FO is present between the transmitter coil and a receiver coil on the basis of a temperature measured by the temperature sensor.

The FOD system may further include a balanced coil disposed between the transmitter coil and the receiver coil, and the processor may determine whether the FO is detected in consideration of an FOD result on the basis of the balanced coil together with an FOD result on the basis of the temperature sensor.

According to yet another aspect of the present disclosure, there is provided an FOD system in a wireless power transfer system, which includes a balanced coil which is disposed between a transmitter coil and a receiver coil and which includes a Maxwell bridge circuit, an AC power source configured to apply a current to a Maxwell bridge circuit, and a processor configured to determine whether an FO is present between the transmitter coil and the receiver coil on the basis of voltage values detected at both ends of the bridge circuit.

The processor may variably control the AC power source to derive a frequency (fmax) at which a voltage difference between both ends of the Maxwell bridge circuit becomes a maximum value and a frequency (fmin) at which the voltage difference becomes a minimum value, and determine the presence or absence of the FO on the basis of the voltage difference at the maximum voltage difference frequency (fmax) and the voltage difference at the minimum voltage difference frequency (fmin).

The processor may determine a type of the FO on the basis of a frequency at which the voltage difference is maximized.

The AC power source may generate an AC power using a numerically controlled oscillator (NCO) and generate an AC signal to be applied to the Maxwell bridge circuit through a DC-AC converter and an analog amplifier.

According to yet another aspect of the present disclosure, there is provided an FOD system in a wireless power transfer system, which includes a balanced coil which is disposed between a transmitter coil and a receiver coil and which includes a Maxwell bridge circuit, an AC power source configured to apply a current to a Maxwell bridge circuit, a temperature sensor configured to measure a temperature of the transmitter coil, and a processor configured to determine whether an FO is present between the transmitter coil and the receiver coil on the basis of voltage values detected at both ends of the bridge circuit.

The temperature sensor may be a fiber Bragg grating (FBG) optical fiber temperature sensor.

The processor may correct a change in voltage value detected at both ends of the bridge circuit according to a temperature change of the transmitter coil on the basis of a temperature measured by the temperature sensor and may determine whether the FO is present on the basis of the corrected voltage value.

In the present disclosure, a pattern light laser-based FOD imaging solution for scanning a specific pattern using a laser light source (a pattern light scanning) and detecting an FO by recognizing a shape of the pattern using a camera in a wireless charging environment for electric vehicles where a transmitter and a receiver are separated is provided. In particular, by scanning a specific pattern, even a surface shape of an object can be recognized and analyzed on the basis of the amount of change in the pattern.

According to yet another aspect of the present disclosure, there is provided a pattern light laser-based foreign material detection (FOD) device in a wireless power transfer system including a power transmitter and a power receiver, which includes a laser light source, a pattern light converter configured to convert light scanned from the laser light source into pattern light, an emitting unit configured to scan the pattern light, and a detector configured to receive the pattern light and detect a pattern image.

According to yet another aspect of the present disclosure, there is provided an FOD method in a wireless power transfer system including a power transmitter and a power receiver, which includes converting light scanned from the laser light source into pattern light and scanning the pattern light, and receiving the pattern light and detecting a pattern image.

A configuration and an operation of the present disclosure will become more apparent from embodiments described in detail below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

FIGS. 9A and 9B are structural diagrams illustrating an example of a buried position according to one embodiment of the present disclosure.

FIG. 19 is a block diagram illustrating a balanced coil having a Maxwell bridge circuit proposed in the present disclosure.

FIG. 23 shows waveform diagrams illustrating a voltage of the detection system according to the present disclosure when an FO is a clip.

DETAILED DESCRIPTION

Figure 1:
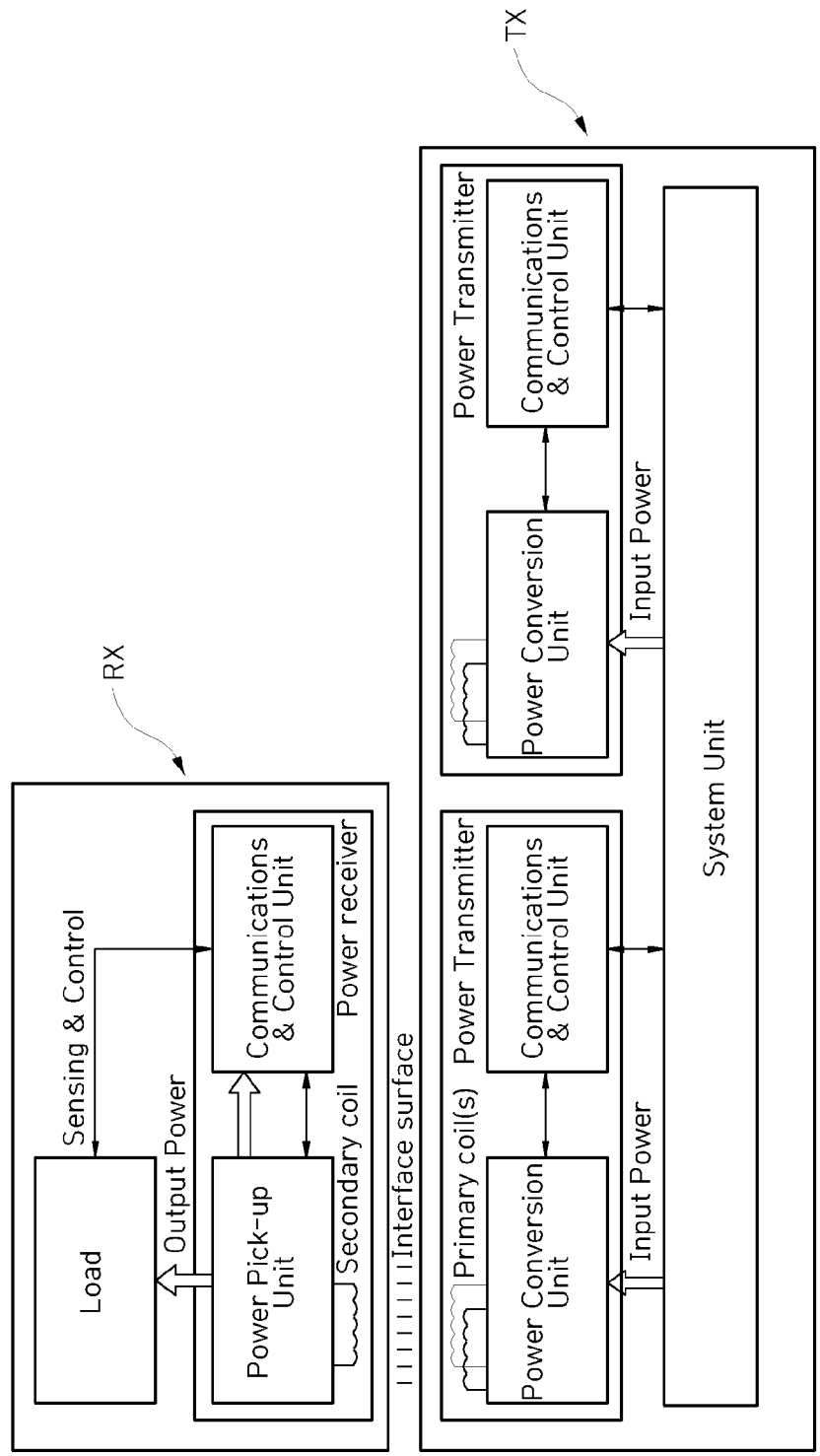
FIG. 1 is a structural diagram illustrating a wireless power transfer system.

An algorithm for determining the presence or absence of FOs affecting the transmitter and the receiver by measuring a Q-factor representing a characteristic of a wireless power transfer system is used. However, as the use of high-output power delivery systems is increased, FOD using simplified Q-factor measurement becomes difficult to recognize FOs of various sizes (specifically, very small metals) and FOs at various separation distances.

Due to the above problem, an algorithm for detecting FOs using a balanced coil is used in high-power systems such as recent electric vehicles.

When the balanced coil is disposed between a transmitter coil and a receiver coil, since a value of inductance L of the balanced coil changes when metallic FOs are inserted, the algorithm operates in a way that compares this change with a reference value (a mutually symmetric value of the inductance L).

However, when metallic FOs are large, they are relatively well recognized, but when a small metal is inserted, since the amount of change is too small to detect a change in value of the inductance L, there is a disadvantage in that it is difficult to use the above algorithm.

In addition, as a power transmission output of a transmitter is increased, a misrecognition rate is drastically increased. This is because, when a balanced coil is used in a high-output power delivery wireless charging system, there is a very high probability that a balance due to a phase change of the balanced coil may be broken as the temperature rises. Therefore, as the output of the transmitter is high, the FO may be accurately detected by calibrating the balanced coil with respect to the temperature rise.

Meanwhile, in wireless power transmission, when metallic objects are inserted between the power transmitter TX and the power receiver RX, an impedance mismatch may occur, which may damage a circuit. In particular, in wireless charging for electric vehicles, when there is a separation distance ranging from about 15 to 30 cm or more between a transmitter and a receiver, and when there are living objects (LOs) in addition to FOs, it may pose a threat to life. For this reason, FOD technology is defined as a very important technology in wireless charging.

In the related art, an algorithm for determining the presence or absence of FOs affecting the transmitter and the receiver by measuring a Q-factor representing a characteristic of the wireless power transfer system is used. However, as the use of high-output power delivery systems is increased, FOD using simplified Q-factor measurement becomes difficult to recognize FOs of various sizes (specifically, very small-sized metals) and FOs at various separation distances. Due to the above problem, an algorithm for detecting FOs using a balanced coil is used in high-power systems such as recent electric vehicles.

Recently, FOD techniques using balanced coils have been introduced in high-power applications. The balanced coil is positioned between the transmitter coil and the receiver coil and is used for the purpose of detecting FOs. When metallic FOs are inserted, the balanced coil operates to compare a change in value of the inductance L with a reference value (a mutually symmetric value of the inductance L). When the metallic FOs are large, they are recognized relatively well, but there is a disadvantage of difficulty in use in that, when a small metal is inserted, since an amount of change is very small, it is difficult to detect a change in value of the inductance L.

On the other hand, like an electric vehicle, since an output of a voltage induced in an FOD coil is very small, it is difficult for only a system using a frequency of 85 KHz to detect a small change in a value of the inductance L due to FOs. For this reason, a balanced coil that detects at a high frequency is used by providing a separate resonant frequency generator (AC signal generator) that generates a frequency of a several MHz instead of the frequency of 85 kHz.

When metallic FOs are inserted, a resonant frequency of the balanced coil may be changed. The resonant frequency change may appear differently depending on various shapes, sizes, and materials of FOs. Therefore, in order to find the optimal L change, a function of detecting and shifting a resonant frequency is required.

Meanwhile, the FOD technique in the wireless power transfer system representatively includes a field-based detection technique and an optic-based detection technique.

Recently, a method of observing a change in impedance of a coil, in which system parameters and field-based detection are mixed, and a coil for dedicatedly detecting a metal that is smaller than transmitting and receiving coils and that is manufactured and placed between the transmitting and receiving coils is utilized. A balanced coil used in this case is manufactured by symmetrically arranging small coils. The principle of the above technique is to measure and compare the impedance of the coils in a symmetrical relationship and determines that there are metallic FOs when a balance is broken. The change in impedance is measured as changes in voltage and current. However, in the detection using a symmetric structure, not only a metal detection antenna but also a transmission antenna should satisfy the symmetric structure, and there is a difficulty in that the two antennas should be placed collinearly. In addition, it is not easy to detect changes in voltage and current with respect to small metals.

The optic-based detection technique utilizes an image, ultrasound, and a light detection and ranging (LiDAR) device and is a particularly suitable solution for detecting LOs. However, since FOD should be performed under the electric vehicle, the possibility of malfunction due to various types of filth is very high. In particular, since the image is sensitively affected by an environment such as illuminance, detection performance can be degraded.

Advantages, features, and methods of achieving them will become apparent from embodiments described in detail below in conjunction with the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art to which the present disclosure pertains, and the present disclosure is defined by only the scope of the appended claims. Meanwhile, terms used herein are for the purpose of describing the embodiments and are not intended to limit the present disclosure. In this disclosure, the singular forms include the plural forms unless the context clearly dictates otherwise. It is noted that the terms "comprises" and/or "comprising" used herein does not exclude the presence or addition of one or more other components, steps, operations, and/or elements in addition to stated components, steps, operations, and/or elements.

Although terms "first," "second," and the like may be used herein to describe various components, these components should not be limited to these terms. The terms are used only for the purpose of distinguishing one component from another component.

Also, in the following description of the present disclosure, when a detailed description of known related art is determined to unnecessarily obscure the gist of the present disclosure, the detailed description thereof will be omitted.

FIG. 1 shows the overall system structure for wireless power transfer. A transmitter generates a magnetic field and transmits power to a receiver without physical contact.

Figure 2A:
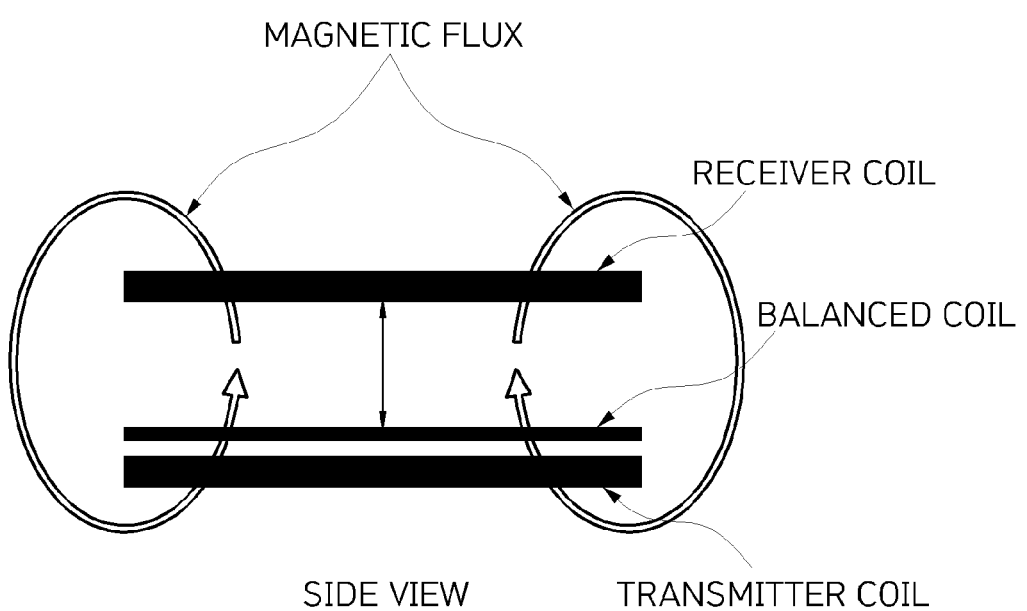
FIG. 2A is a block diagram illustrating coils including a balanced coil for foreign object detection (FOD), which is employed in the present disclosure.

During wireless power transfer, when metallic foreign objects (FOs) are inserted between the transmitter and the receiver, since high-temperature heat is generated, a foreign object detection (FOD) technique for detecting FOs is required. To this end, a balanced coil is generally used in high-power wireless charging. As shown in FIG. 2A, a balanced coil is disposed between a transmitter coil of a transmitter side and a receiver coil.

In this case, the transmitter side refers to all parts, excluding the receiver coil.

Figure 2B:
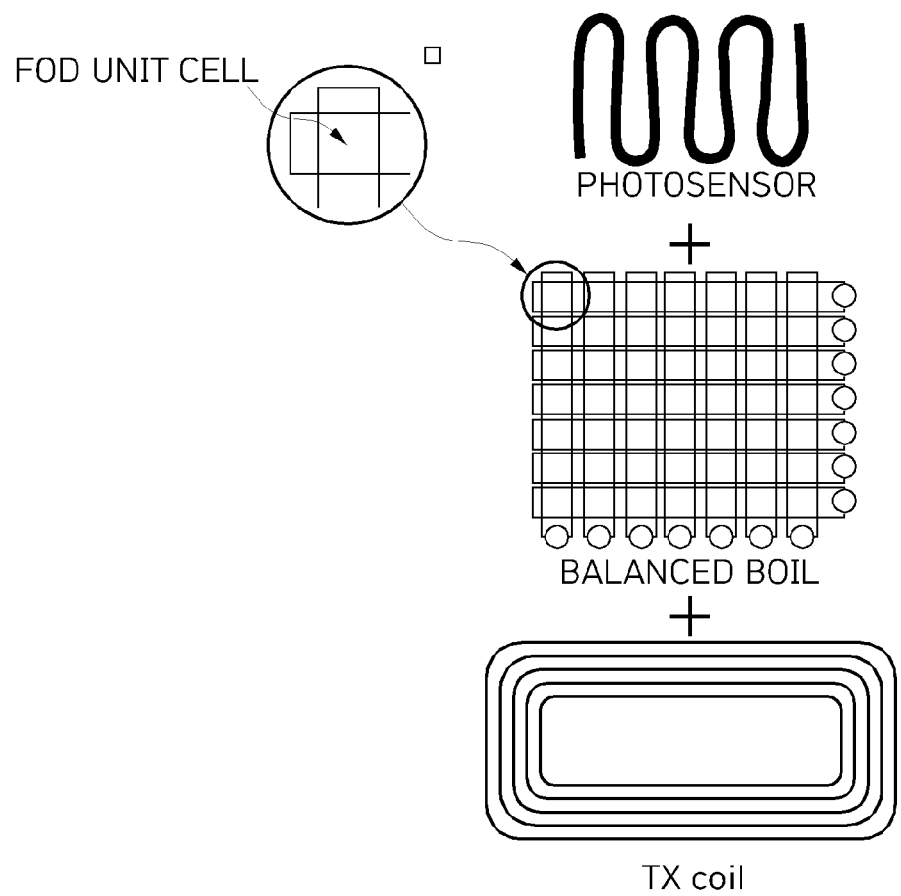
FIG. 2B is a schematic layout illustrating a temperature sensor, a balanced coil, and a transmitter coil according to the present disclosure.

As shown in FIG. 2B, in the present disclosure, the transmitter side includes the transmitter coil and the balanced coil, and one unit of the balanced coil in a grid shape is referred to as an FOD unit cell.

In addition, an optical sensor for temperature measurement may be further included to perform balanced coil correction according to a temperature change, and the optical sensor for temperature measurement will be described below. First, a configuration of the balanced coil according to the present disclosure will be described.

In a method according to the related art, a small change in inductance L is amplified using an amplifier and is sensed using the balanced coil. As described above, since there is a problem in that detection sensitivity differs depending on a size of the FO, in the present disclosure, a method of measuring a change in voltage across both ends of a bridge circuit using a Maxwell bridge circuit is proposed.

That is, the balanced coil according to the present disclosure has a Maxwell bridge circuit.

Figure 3:
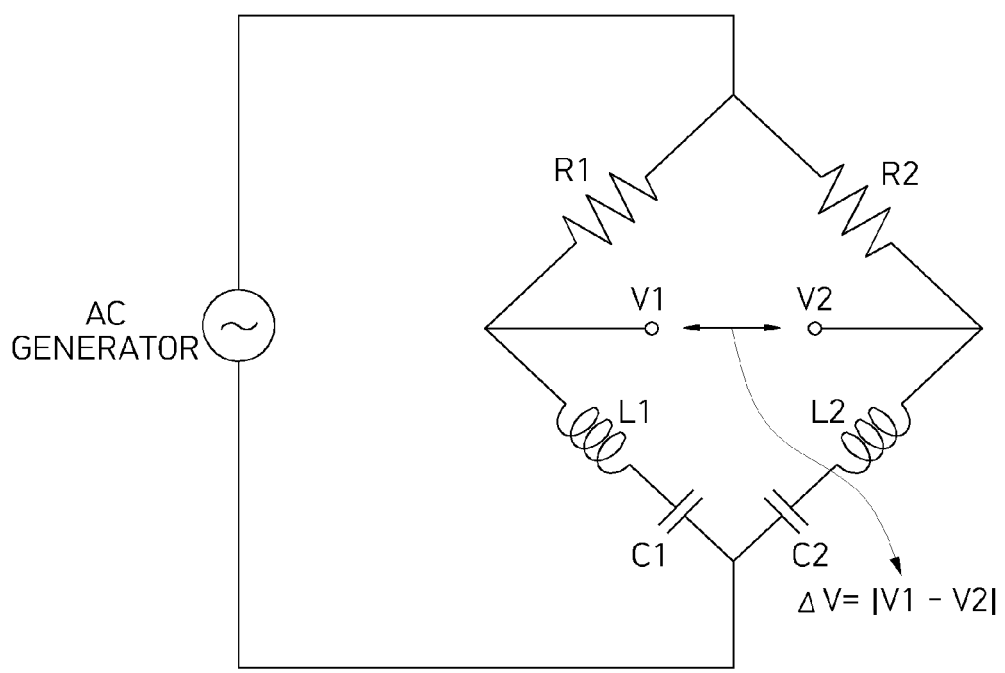
FIG. 3 is a reference diagram for describing a configuration of the balanced coil according to the present disclosure.

As shown in FIG. 3, the Maxwell bridge circuit has a structure in which a voltmeter is located in the middle of the bridge circuit and is used to measure an unknown value of inductance L by applying an AC voltage. In FIG. 3, voltages applied to both ends of L1 and L2 are V1 and V2, respectively, and in FIGS. 4A-4D, a voltage difference |V1−V2| is expressed as ΔV or Δ'V.

Figure 4A:
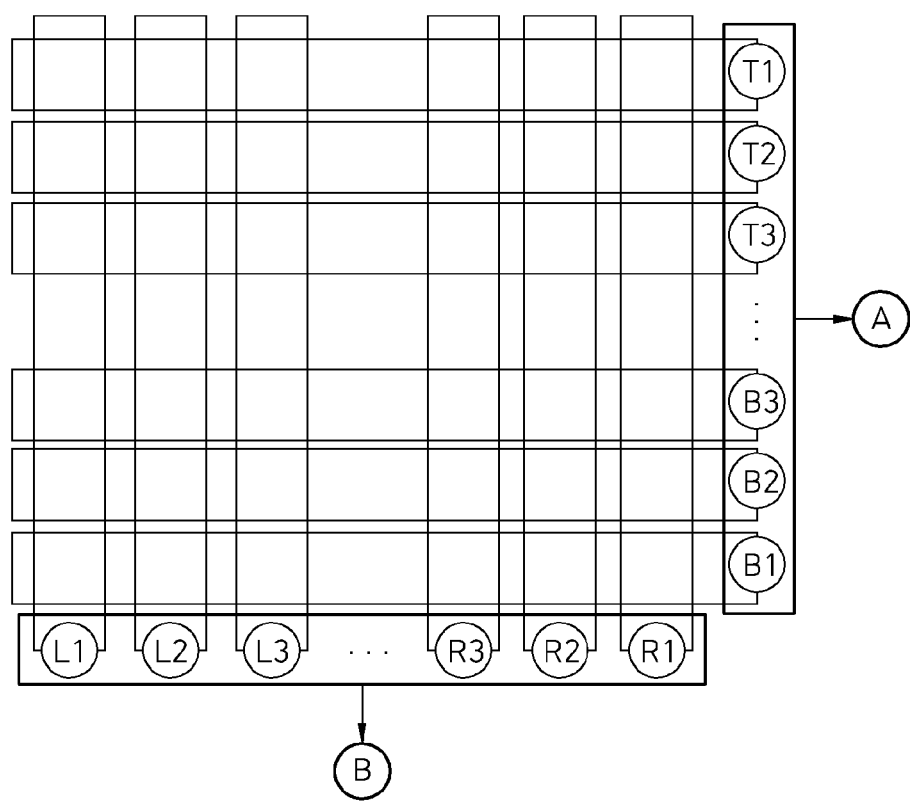
FIGS. 4A-4D are block diagrams illustrating the balanced coil including a Maxwell bridge according to the present disclosure.
Figure 4B:
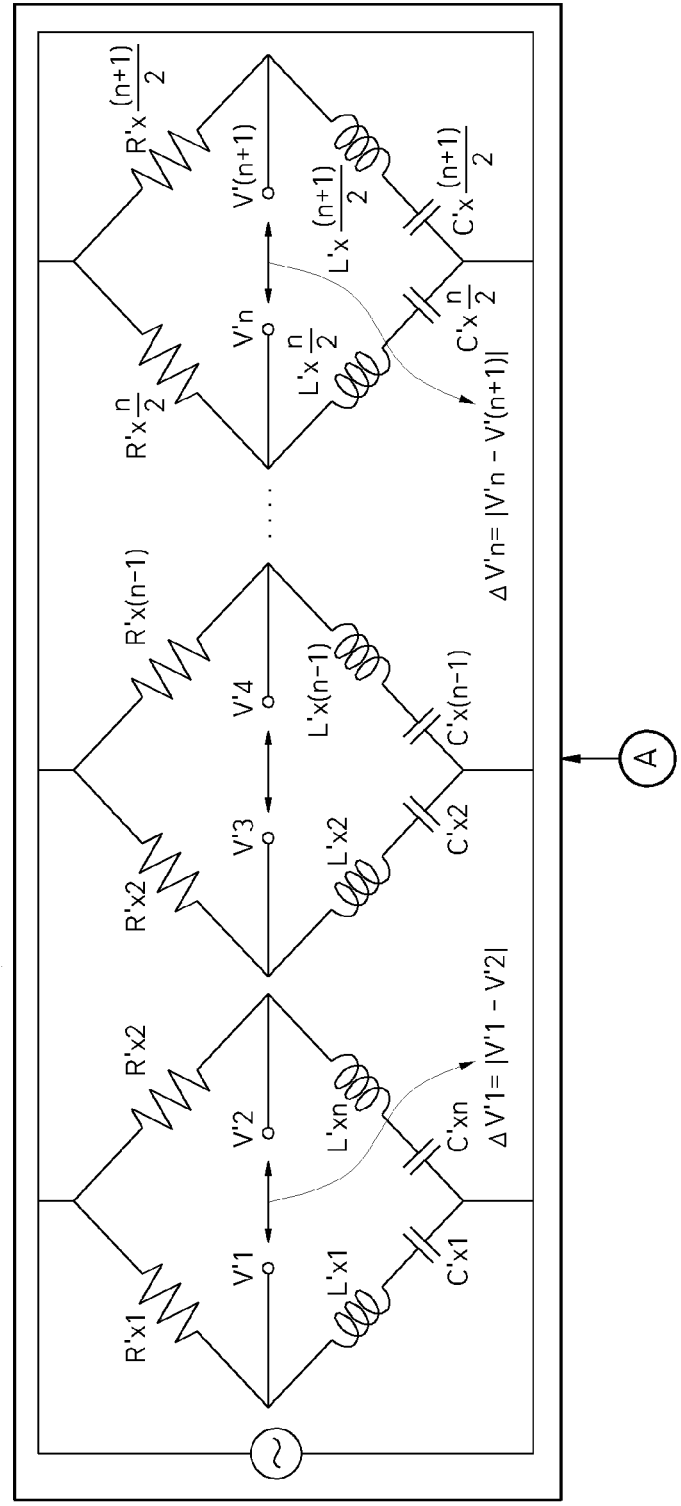
Figure 4C:
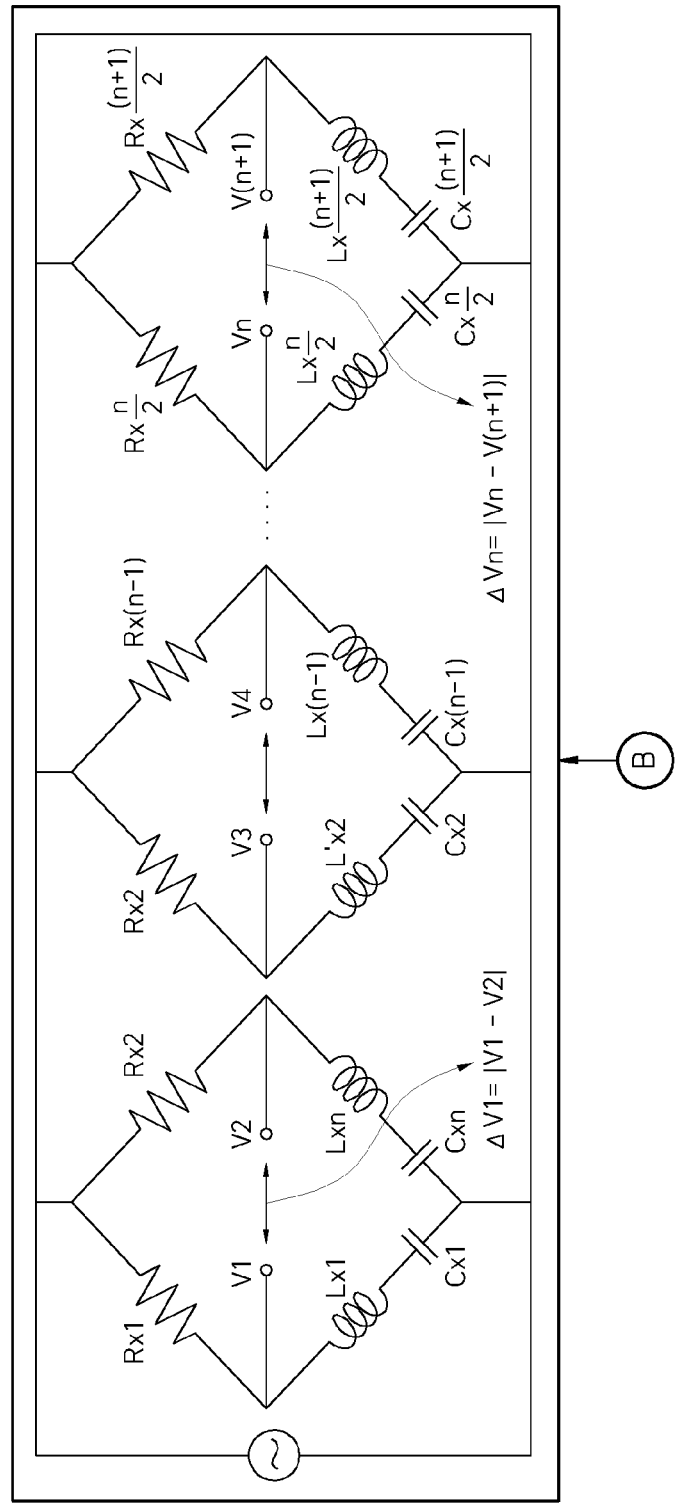

FIGS. 4A-4D are examples of a structure in which the balanced coil according to the present disclosure is formed by overlapping Maxwell bridge circuits As shown in FIGS. 4A-4C, the balanced coil according to the present disclosure includes vertically disposed unit coils L1, L2, L3, . . . , R3, R2, and R1, and horizontally disposed unit coils T1, T2, T3, . . . , B3, B2, and B1. Pairs of the unit coils L1 and R1, L2 and R2, L3 and R3, T1 and B1, T2 and B2, and T3 and B3 are formed to be symmetrically balanced (induced voltage values are the same). A power source may be added to generate a voltage across both ends of the bridge circuit. Meanwhile, in FIG. 4 and the description related thereto, reference numerals L1, L2, L3, . . . , R3, R2, and R1 indicate left and right unit coils among two or more vertically disposed unit coils, and it is noted that the reference numerals are not used to indicate the inductance L and resistance R of the electric circuit.

In an example of FIGS. 4A-4C, an inductance difference between the pair of unit coils L1-R1 becomes |Lx1−Lxn|=ΔV1 at a lower end of the balanced coil, and an inductance difference between the pair of other unit coils B1-T1 become |L'x1−L'xn|=ΔV'1. Therefore, by detecting a difference between voltage values of the both ends of the Maxwell bridge circuit of each pair of the unit coils (e.g., L1 and R1, and T1 and B1) constituting the balanced coils which are mutually balanced, the presence and location of foreign objects can be accurately identified with high reliability.

Figure 4D:
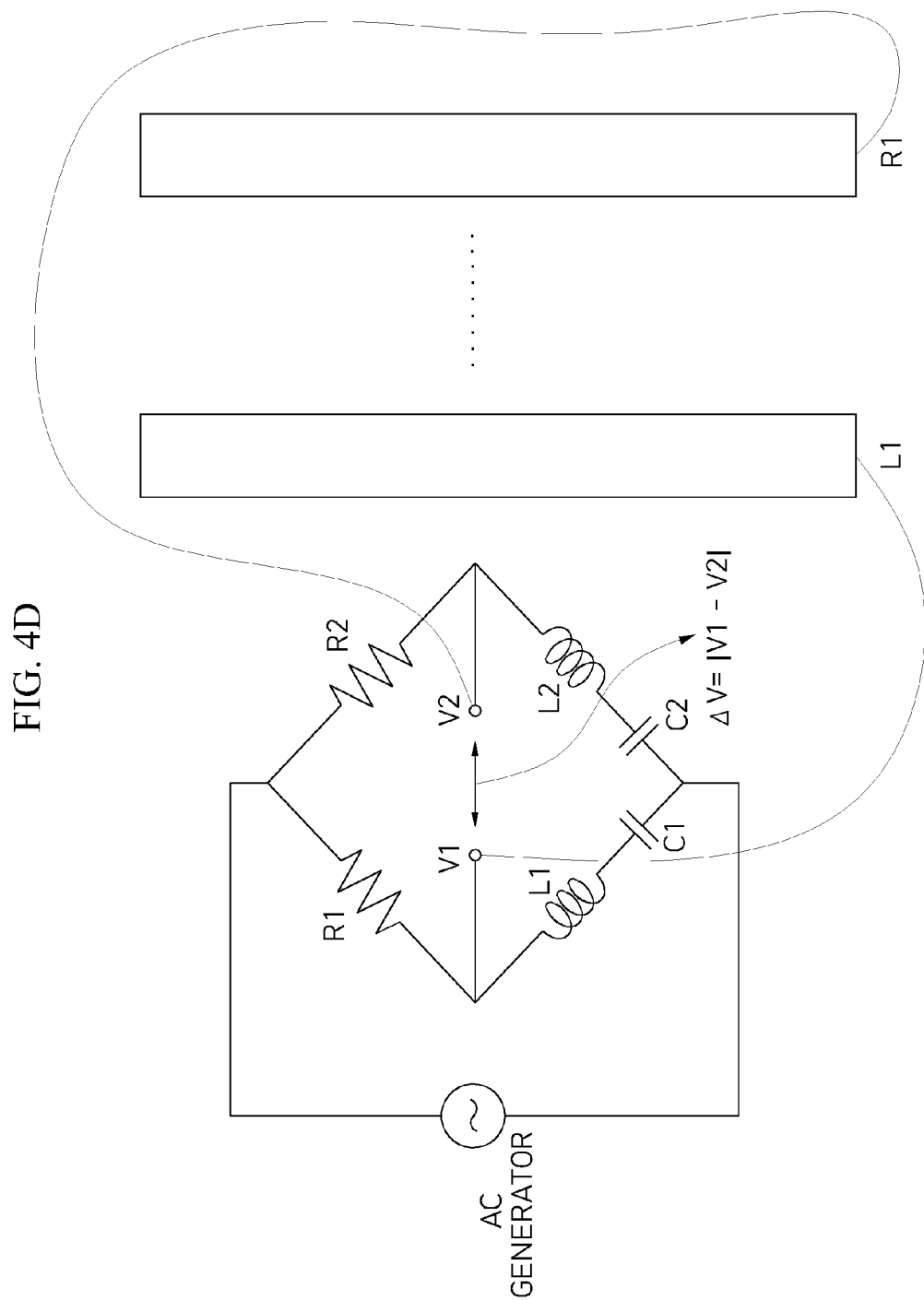

FIG. 4D shows, in more detail, a configuration in which the Maxwell bridge circuit is applied to the balanced coil. That is, the pair of unit coils (e.g., L1 and R1) are electrically connected to the both ends of one Maxwell bridge circuit.

Figure 5A:
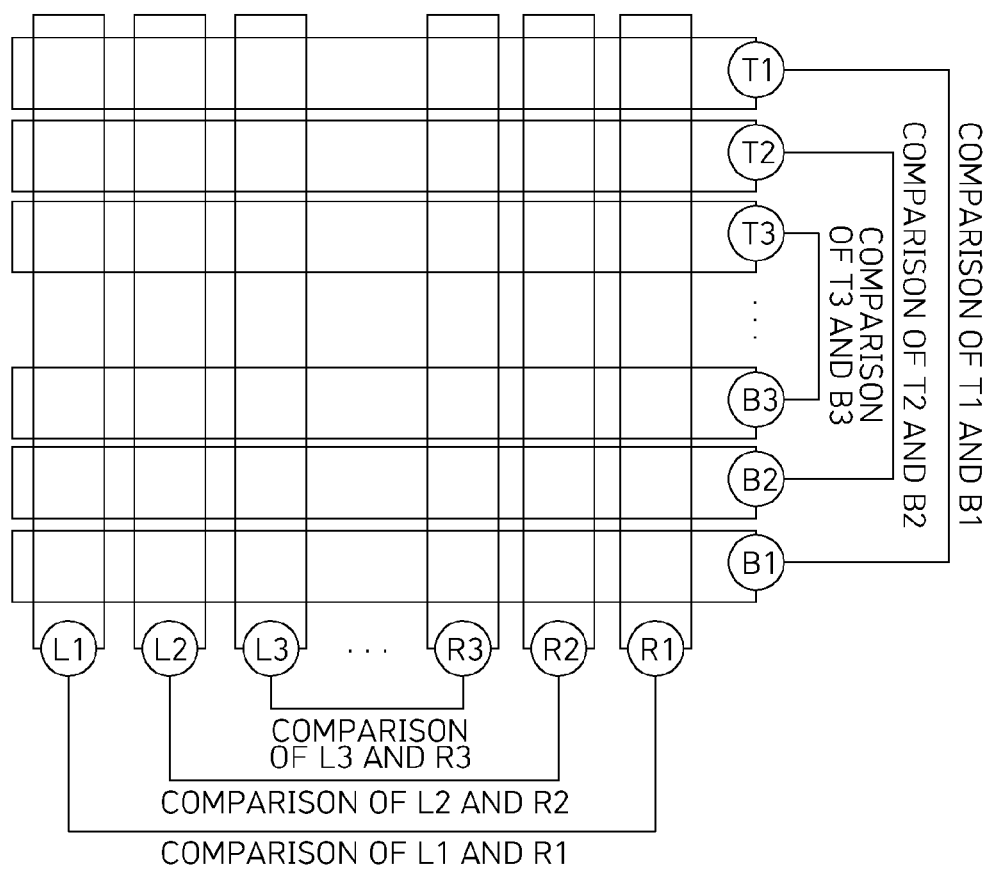
FIGS. 5A and 5B are reference diagrams for describing an operation principle of the FOD using the balanced coil according to the present disclosure.
Figure 5B:
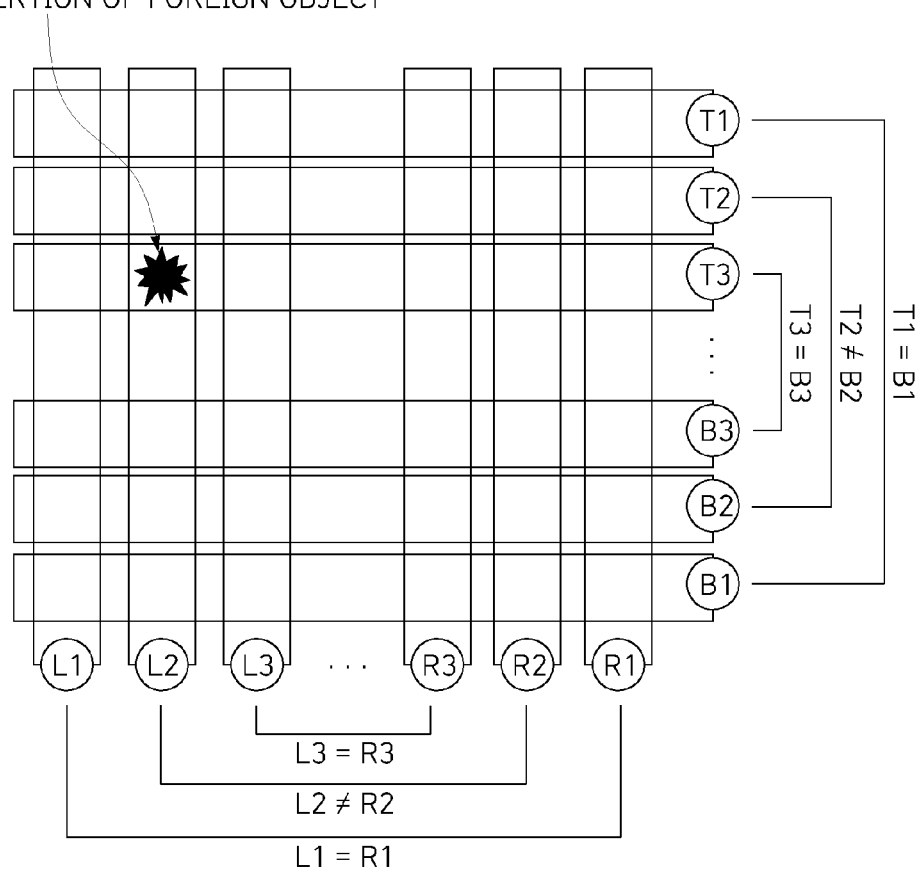

FIGS. 5A and 5B show a detection operation principle using an FOD detection coil as the balanced coil for FOD.

As shown in FIG. 5A, a detection circuit according to the present disclosure is formed such that the pairs of the unit coils L1 and R1, L2 and R2, L3 and R3, T1 and B1, T2 and B2, and T3 and B3 are formed to be symmetrically balanced (induced voltage values are the same), thereby detecting an FO by comparing voltage values of the pairs of unit coils.

When an FO is inserted in a position shown in FIG. 5B, values (induced voltage) of L2 and R2, and T3 and B3 are changed. The reason why the voltages induced by the FO change is that the inductance L of a metallic FO affects the inductance L of adjacent unit coils (L2 and T3 in the present example) to change mutual inductance. In this way, the FOD may be performed by measuring a voltage value of each unit coil constituting the balanced coil.

In order for the balanced coil to operate well as in the above-described example, it is necessary to know an initial voltage value when the pair of unit coils (i.e., L1 and R1, L2 and R2, L3 and R3, T1 and B1, T2 and B2, and T3 and B3), which are symmetrically connected, are correctly balanced or the FO is not present. This is because the method of detecting an FO is a method of measuring whether an initial voltage value changes.

As shown in the following logical expression, when a change amount of an initial voltage difference ΔV or more of the pair of unit coils occurs, it may be determined that the FO is present.

If [voltage difference of Ln−Rn>(ΔVn or ΔV'n)] or [voltage difference of Tm−Bm>(ΔVn or ΔV'n)],
then FO is present.

As described above, unlike the balanced coil according to the related art, the balanced coil of the present disclosure to which the Maxwell bridge circuit is applied may detect an FO with high reliability and high accuracy regardless of a size of the FO or a magnitude of the magnetic inductance of the FO.

Although not shown in the drawings, it is natural that the FOD system according to the present disclosure is provided with a determination processor for detecting an FO using the above-described logic on the basis of the voltage value across the both ends of the Maxwell bridge circuit of the balanced coil. The determination processor may be a separate arithmetic device (including a personal computer (PC), a notebook computer, and a server computer) or may be an arithmetic device built in or attached to the transmitter or the power transmission system.

Figure 6A:
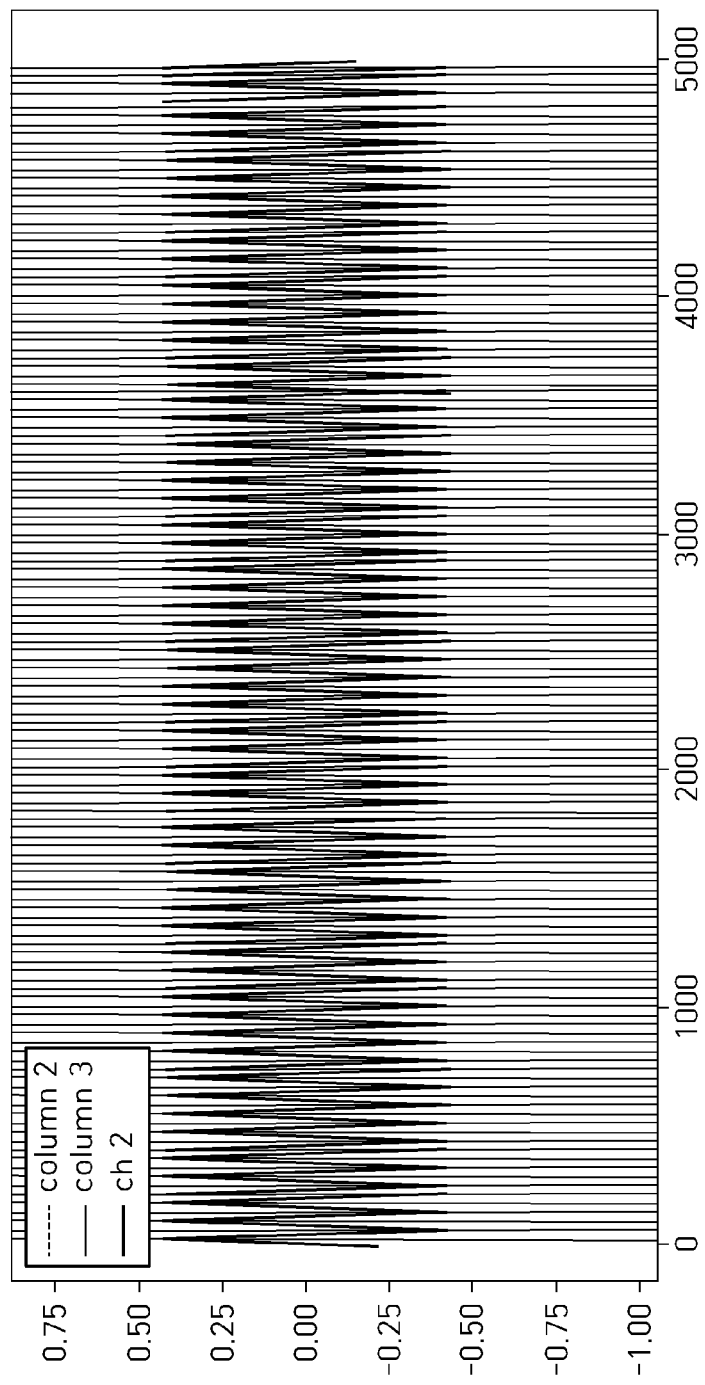
FIGS. 6A and 6B are measurement graphs showing an effect of a temperature on an output voltage of the balanced coil.
Figure 6B:
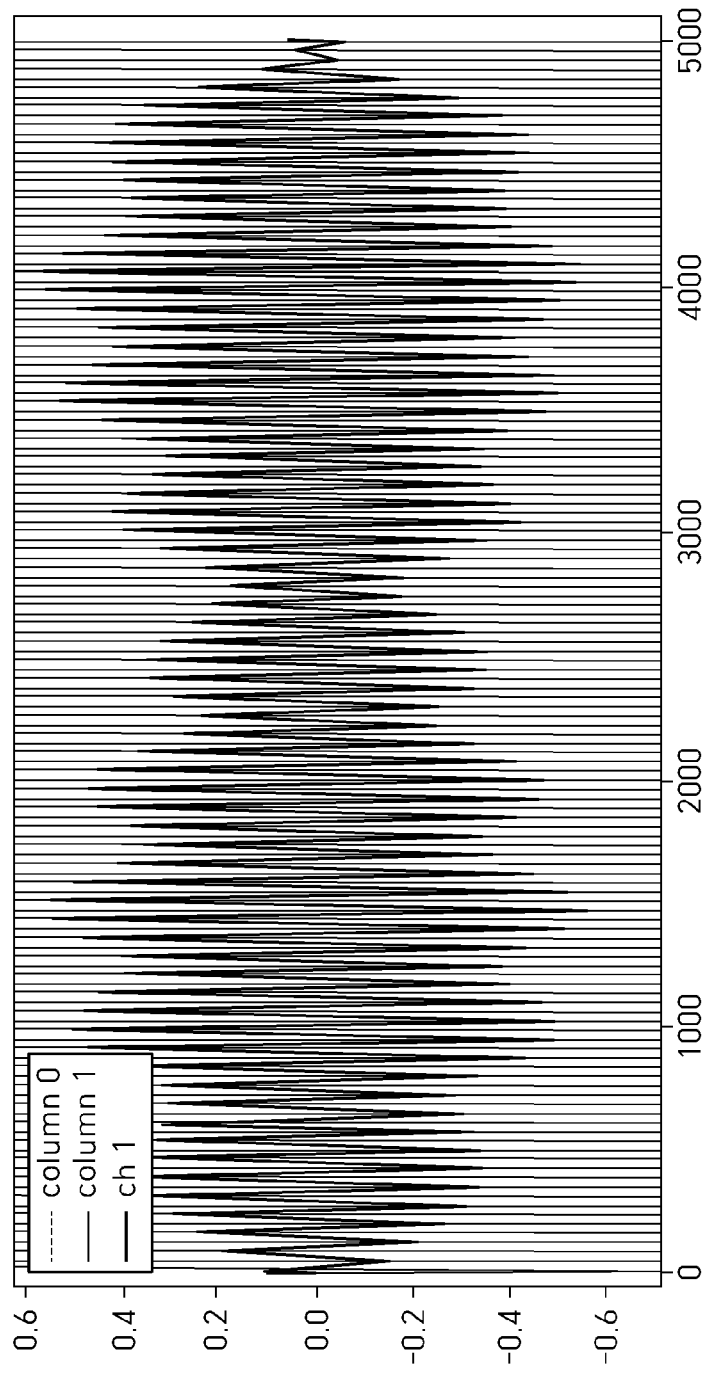

Meanwhile, the amount of change in ΔV or Δ'V measured in the above-described example may be affected by temperature. For example, FIG. 6A is a voltage graph of ΔV and Δ'V (red color) at a room temperature (normal) of 20 degrees, and FIG. 6B is a voltage change graph of ΔV at a temperature of 40 degrees. In the graph, a Y-axis indicates a voltage value, and an X-axis indicates a measurement time (ms). The Δ'V pattern is similar.

In consideration of this point of view, as in the following examples, the inventor of the present disclosure has considered an additional configuration for more accurate FO detection.

Referring to FIGS. 6A and 6B in detail, it can be seen that ΔV was measured as 1 V at room temperature (ΔVnormal=1 V), and ΔV was measured as 12 V at a temperature of 40 degrees (ΔV40=1.2 V). Assuming that a value of ΔV is increased as the temperature is increased, when a temperature is changed by as much as 20 degrees from a room temperature of 20 degrees to a temperature of 40 degrees, a change in voltage difference ΔV (normal$_{+20}$) may be obtained from the following Equation 1.

$$\Delta V_{(normal+k)} = \Delta V_{normal} + e\Delta V_k (e=\text{variable}, k=\text{changed temperature})$$ [Equation 1]

Here, a variable e is a variable learned according to the temperature difference, and temperature correction is possible according to the value of e (here, −1<e<1).

That is, when a temperature change of the balanced coil (exactly, a transmitter coil which transmits power and of which temperature may be increased) is accurately measured, ΔV and Δ'V may be corrected so that accurate FOD is possible.

During power transmission, a part where temperature is mainly increased is the transmitter coil (a primary side coil), and thus not only a surface temperature but also a temperature of an FO may be measured when the temperature should be measured at the transmitter coil. However, it is difficult to apply contact-type temperature sensors such as a thermocouple, a resistance temperature detector (RTD), and a thermistor or infrared-type non-contact temperature sensors to the transmitter coil due to electromagnetic interference (EMI). Therefore, it is necessary to apply a temperature sensor not affected by EMI.

In consideration of this point of view, in the present disclosure, a fiber Bragg grating (FBG) optical fiber temperature sensor is used to measure a temperature change of the transmitter coil and a temperature at each position of the balanced coil.

Figure 7A:
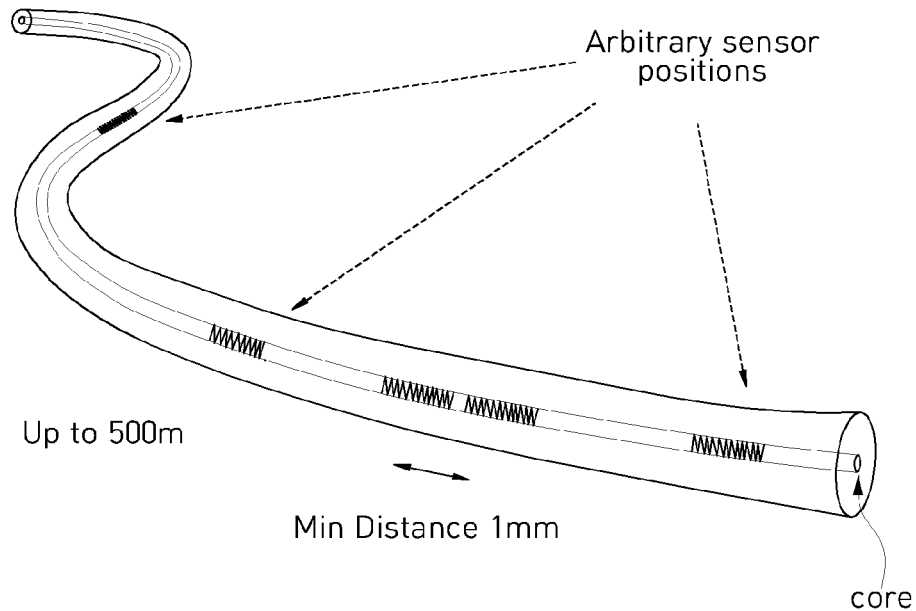
FIG. 7A is an overview diagram illustrating a temperature sensor employed in the present disclosure.

FIG. 7A is a diagram illustrating an FBG optical fiber temperature sensor employed in another embodiment (a second embodiment) of the present disclosure. The FBG includes a fiber and gratings. A core is present in the center of the FBG fiber optic temperature sensor, the gratings are indicated by red dots in the drawing. The gratings are generated due to an increase in refractive index when a core of an optical fiber core is exposed to ultraviolet rays. Each grating reflects a part of propagating light, and when the reflected light signals are combined, it becomes one large reflection at a specific wavelength, and the specific wavelength is referred to as a Bragg wavelength. A temperature is obtained by detecting the amount of change in Bragg wavelength and calculating the amount of change as the amount of physical change.

As described above, EMI is the most common cause of measurement errors and malfunctions occurring in an electrical sensor system, and in the present disclosure, an optical fiber having little effect on electromagnetic waves may be used to solve the above problem. Since light is a source in the FBG fiber optic temperature sensor, even when a length of a cable is elongated or the cable is affected by an electrical signal, noise and distortion do not occur in a signal.

Figure 7B:
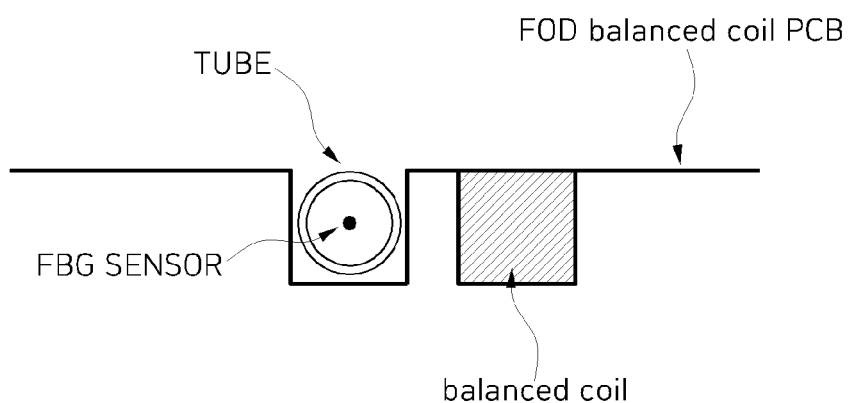
FIG. 7B is an exemplary diagram illustrating a structure applied to the balanced coil in the temperature sensor according to the present disclosure.

FIG. 7B is a cross-sectional view illustrating a structure in which an FGB sensor is embedded in a FOD balanced coil printed circuit board (PCB) according to the second embodiment of the present disclosure. A sensor is embedded in the fiber optic cable, and thus the fiber optic cable itself serves as a sensor. A customized tube is manufactured to protect an optical fiber which is sensitive to strain. The optical fiber is in the form of floating in the tube, and this form is a structure being embedded instead of being attached.

In the present embodiment, the FBG optical fiber temperature sensor corresponds to or is proportional to the number of unit cells of the balanced coil. In a single channel, the maximum number of sensors attachable to one FBG fiber optic cable is 30.

Figure 8A:
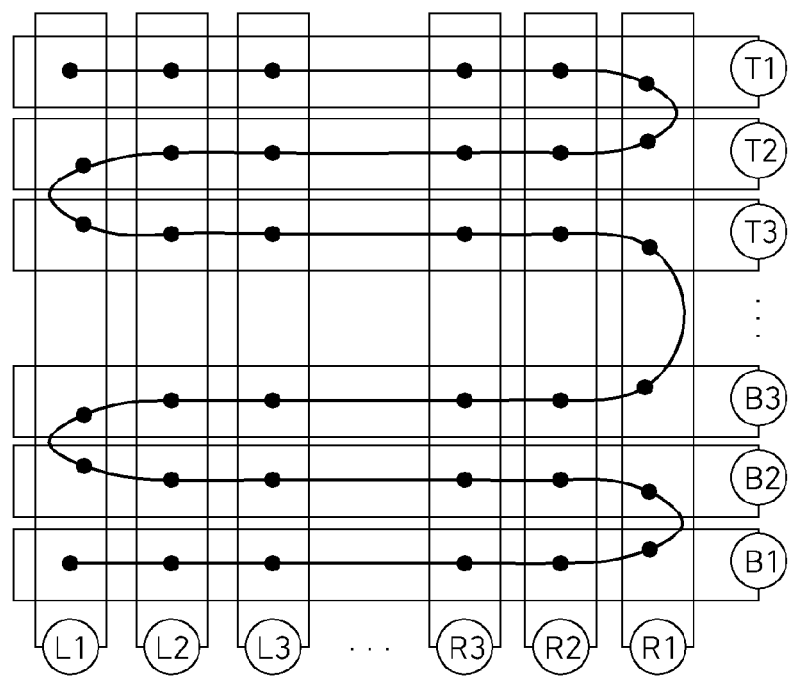
FIGS. 8A-8C are structural diagrams illustrating an example in which a temperature sensor is disposed according to one embodiment of the present disclosure.
Figure 8B:
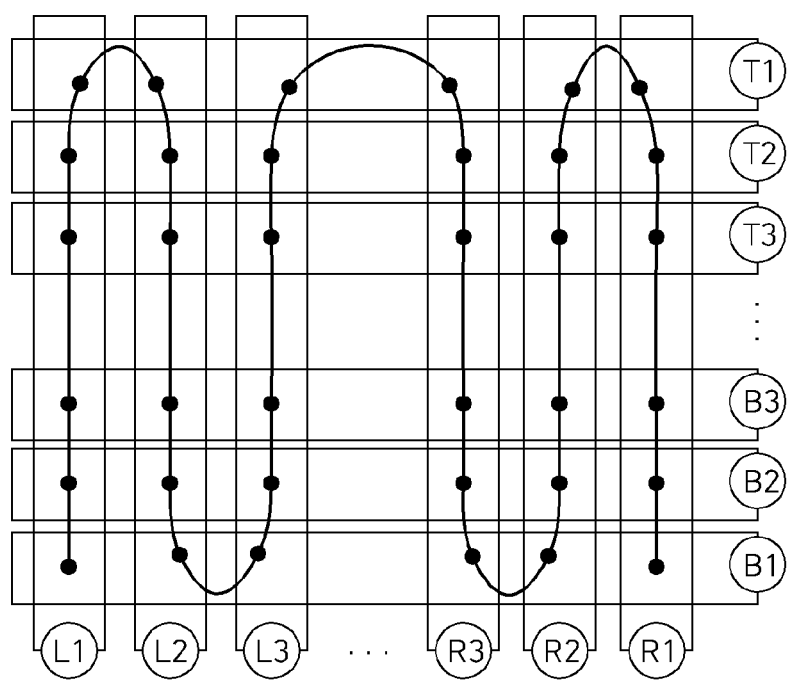
Figure 8C:
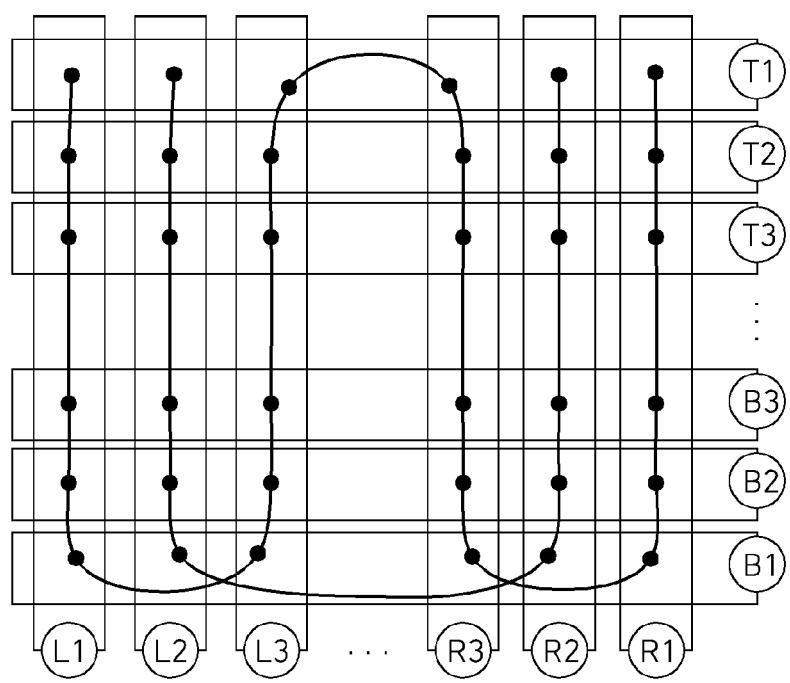

As shown in FIGS. 8A and 8B, the sensors may be installed in a single channel (a single optical fiber) in a transverse direction, a longitudinal direction, or any other direction. However, when more sensors are required or when the channel is to be operated for other purposes, a multi-channel may be selected as shown in FIG. 8C.

Figure 9A:
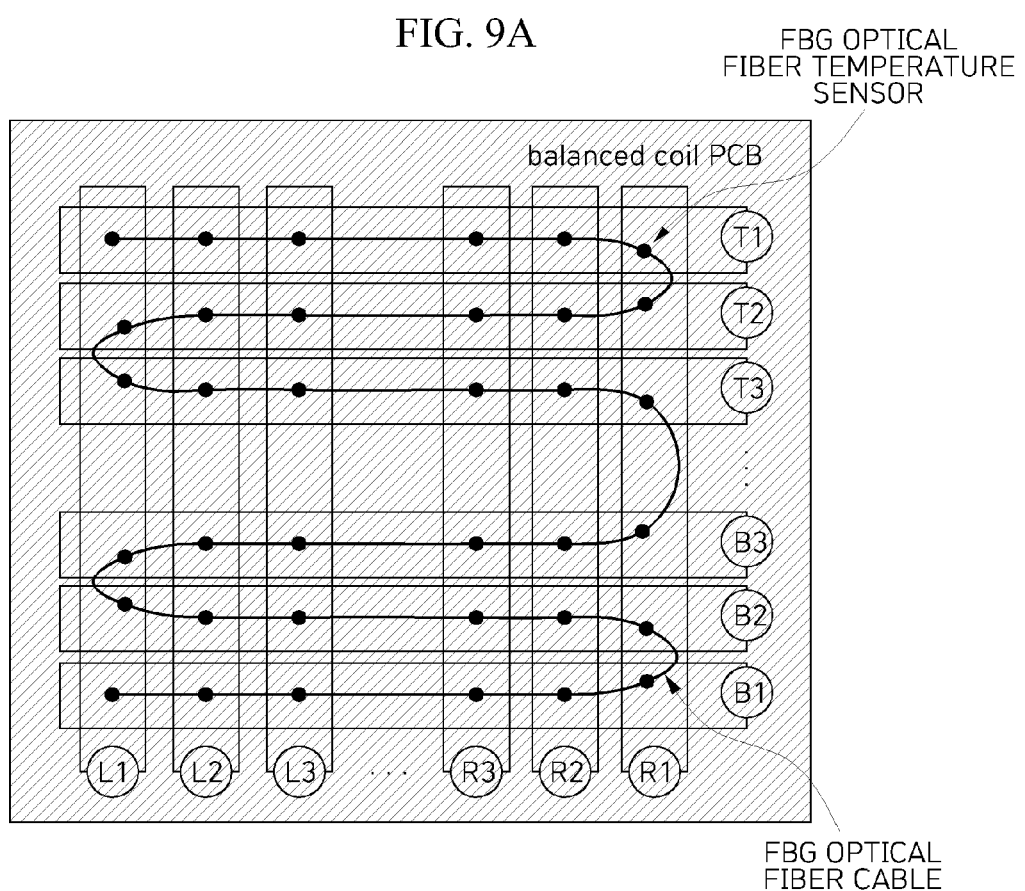

FIGS. 9A and 9B illustrate an arrangement of the FBG optical fiber temperature sensor. The FBG fiber optic temperature sensor is disposed along or in consideration of the balanced coil and the transmitter coil. FIG. 9A is an example in which the FBG fiber optic temperature sensor is embedded in the balanced coil PCB, and FIG. 9B is an example in which the FBG fiber optic temperature sensor is embedded in the transmitter coil (TX coil). The embedding in the transmitter coil means embedding adjacent to or near the transmitter coil, such as between transmitter coils, above the transmitter coil, and below the transmitter coil. When a structure in which the FBG fiber optic temperature sensor is embedded is provided in this way, any pattern embedded below or above the transmitter coil may be applied to any structure. When the flexibility of the FBG fiber optic temperature sensor and a characteristic in which the sensor is freely disposed are used, it is possible to attach the FBG fiber optic temperature sensor to any coil of any structure.

It is natural that a determination processor is provided to perform correction according to temperature and detect an FO on the basis of temperature values of the transmitter coil and/or the balanced coil, which are measured using the above structure. The determination processor may be a separate arithmetic device (including a PC, a notebook computer, and a server computer) or may be an arithmetic device built in or attached to the transmitter or the power transmission system.

Figure 10:
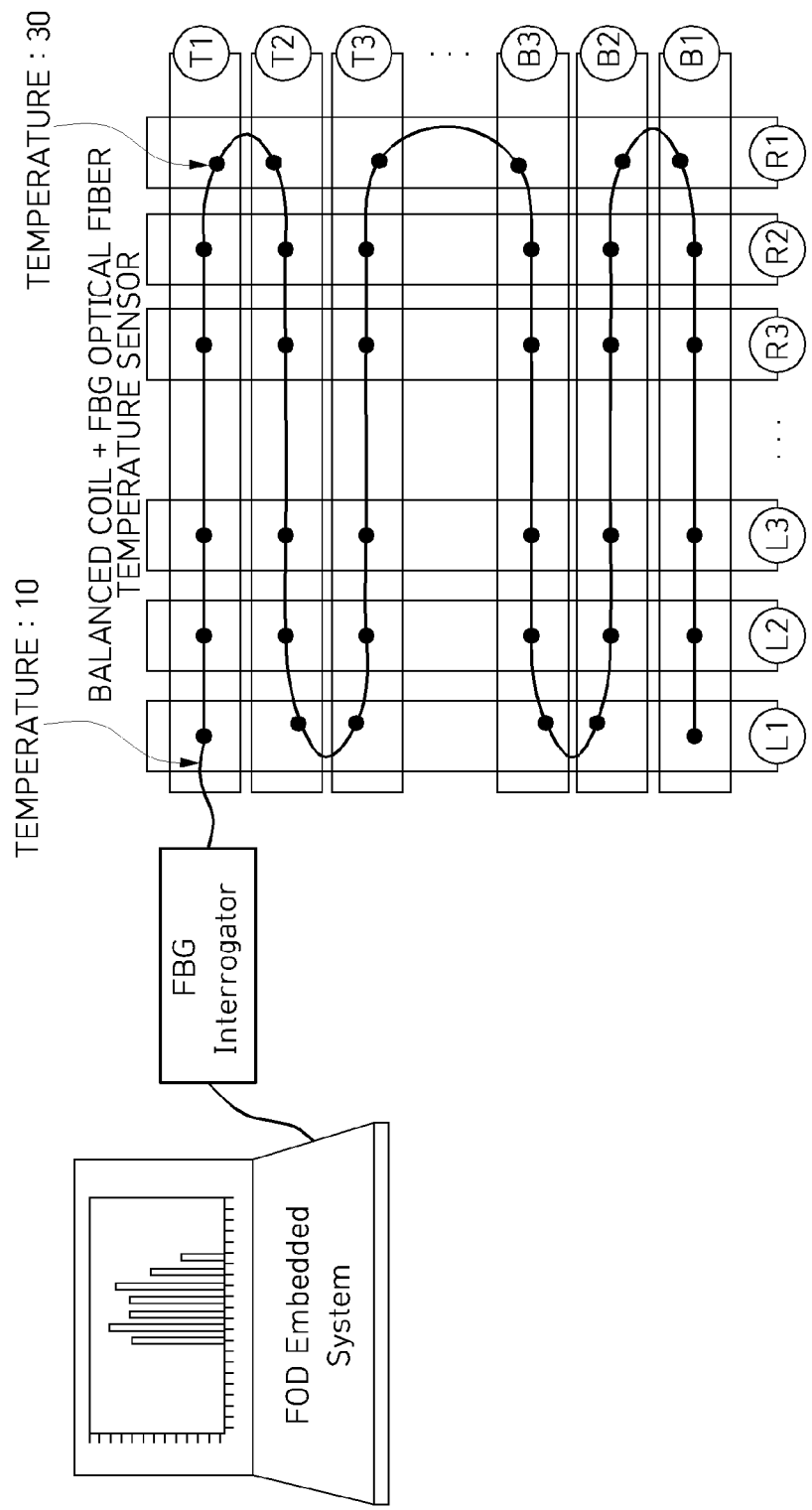
FIG. 10 is a block diagram illustrating an FOD system according to the present disclosure.

FIG. 10 is a system configuration for measuring a value of the FBG optical fiber temperature sensor according to the present disclosure. An FBG interrogator is used to measure the value of the FBG fiber temperature sensor. The FBG interrogator connects the FBG optical fiber temperature sensor, which receives a light signal and detects a temperature, to a user PC, which receives a light signal reflected from an FBG sensor module, measures a temperature, and monitors a changed value.

As shown in FIG. 10, the FBG optical fiber temperature sensor according to the present disclosure has an advantage of being capable of measuring the amount of change in temperature at several points (preferably, positions of the unit cells of the balanced coil) by inserting several sensors into a single optical fiber.

In summary, according to the present disclosure, when the transmitter and the receiver are aligned, the balanced coil is used for the purpose of measuring ΔV and detecting an FO. In addition, since a change in voltage difference may occur according to the temperature, ΔV is corrected on the basis of the temperature measured using the FBG optical fiber temperature sensor to enable more accurate FO detection.

However, in a misalignment state in which the positions of the transmitter and the receiver are offset, the above-described method may not effectively detect an FO.

In still another embodiment (a third embodiment) of the present disclosure, in order to remedy the above disadvantage of the balanced coil, an FBG temperature sensor capable of detecting an FO by detecting a temperature at each point is disclosed.

Figure 11:
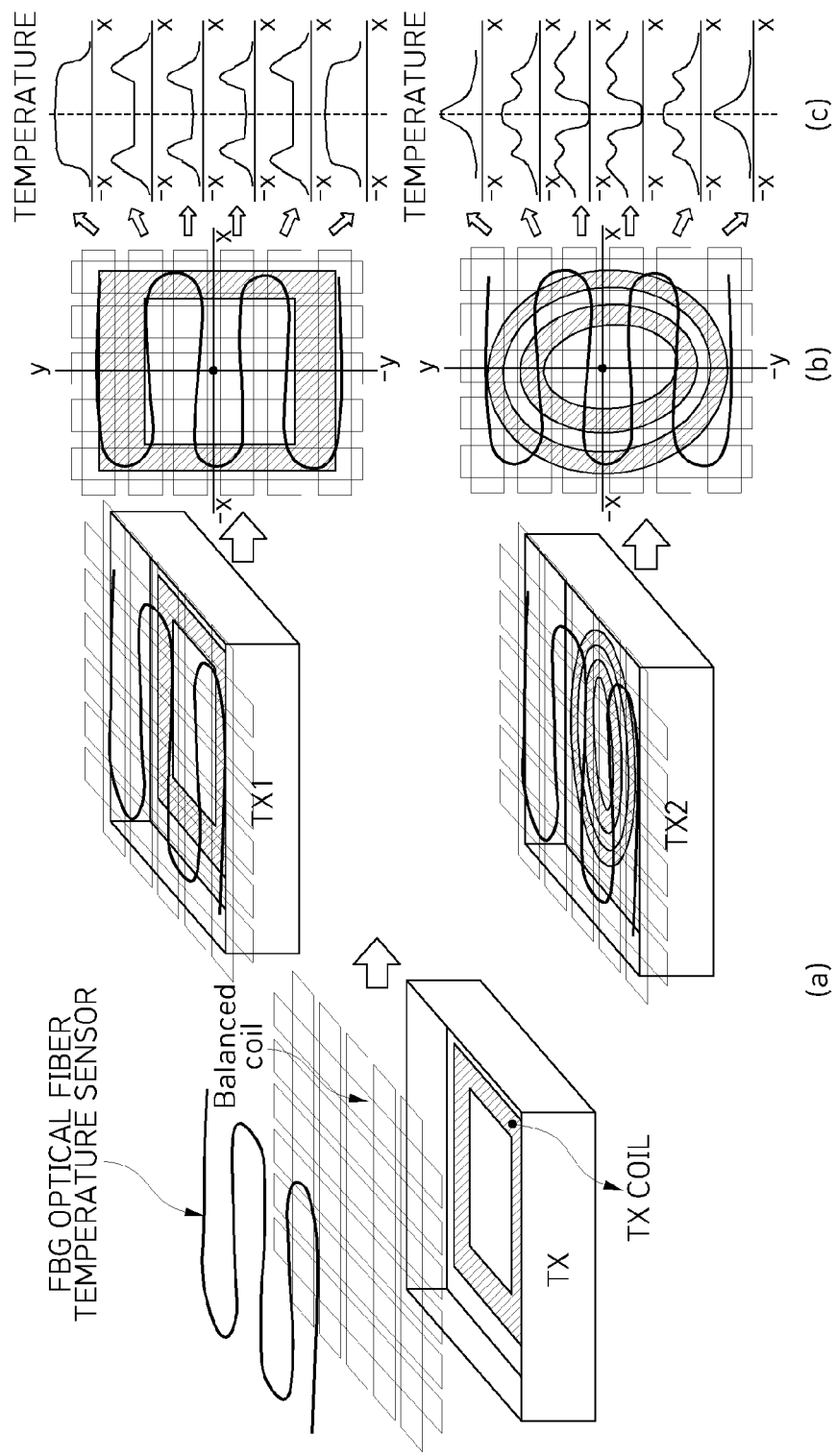
FIG. 11 is a temperature change graph showing characteristics of temperatures detected according to an arrangement of the temperature sensor according to the present disclosure.

For example, as shown in (c) of FIG. 11, temperatures are measured at a plurality of positions (for example, unit cells) of the balanced coil, and when the temperatures of the FBG optical fiber temperature sensor are differently measured as 10 degrees and 30 degrees at the plurality of positions, it may be determined as a case in which an FO is present. In this way, by using the advantage of being capable of measuring more precisely the temperature of the FBG optical fiber temperature sensor, it is possible to detect the FO on the basis of a temperature change.

(a) of FIG. 11 is a conceptual diagram of a wireless charging transmitter to which FOD and an optical fiber temperature sensor are added. First, an alignment state of the transmitter and the receiver through a ΔV change of the balanced coil is checked. Next, a temperature of each unit cell of the balanced coil is detected using the FBG optical fiber temperature sensor to detect an FO.

In the present embodiment, as shown in (b) of FIG. 11, a section of the balanced coil or the transmitter coil is divided into 5×67=30 sections in total. Temperature sensors of the FBG optical fiber temperature sensor may be designed to be placed in each section. In the drawing, the transmitter coil includes examples of a rectangular transmitter coil TX 1 and a double-circle structure transmitter coil TX 2. (c) of FIG. 11 shows that temperature measurement graphs are drawn differently according to the shape of the transmitter coil.

In the present embodiment, although the FO is measured according to the amount of change in value of the FBG optical fiber temperature sensor, the temperature being merely measured high does not mean that the FO is present.

Figure 12:
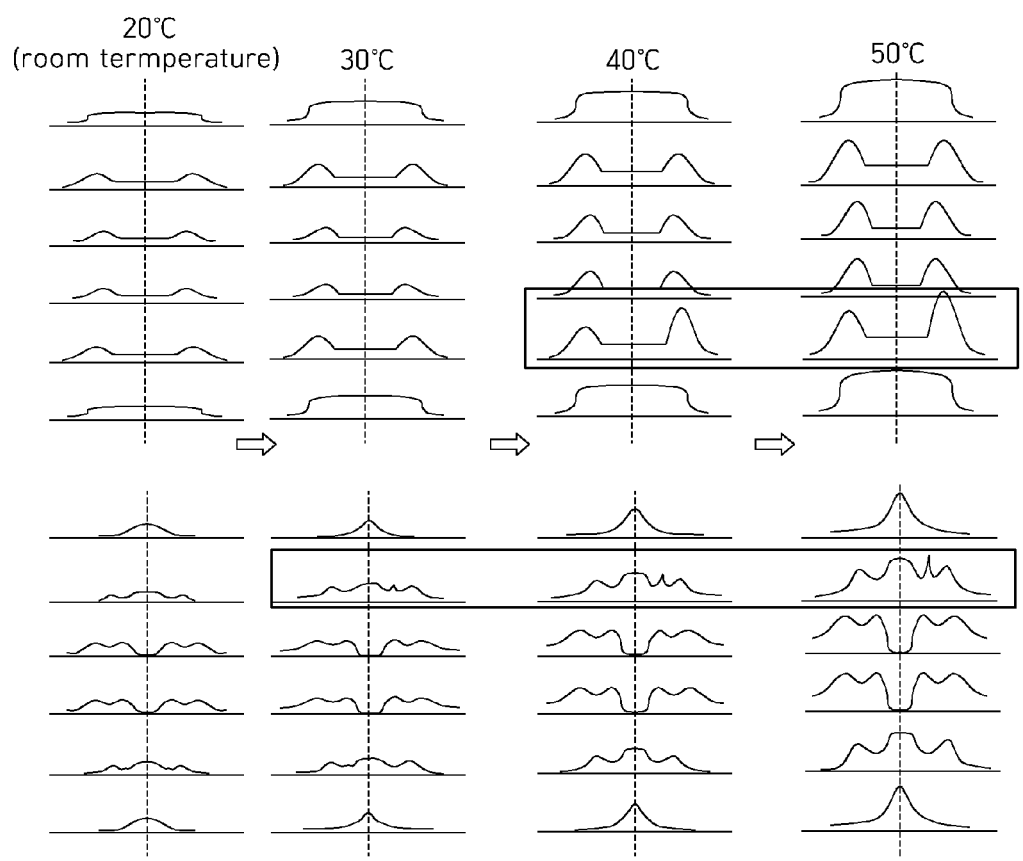
FIG. 12 shows temperature change graphs showing a change in waveform for each temperature according to the presence or absence of FOs according to the present disclosure.

FIG. 12 shows graphs showing that the temperatures change as the transmitter coil generates heat are measured at six positions using the FBG optical fiber temperature sensor, and a pattern of a temperature change of the transmitter coil is shown. Boxed portions are graphs showing the temperature change of the transmitter coil when the FO is present, and the other portions are graphs measured when the FO is not present.

When the FO is present, the FO itself also generates heat, and thus a temperature change at a corresponding position is abrupt so that the temperature waveform changes characteristically. Therefore, it is possible to check the presence or absence of the FO through the temperature change graphs at a plurality of positions and also to determine at which position the FO is present.

That is, a temperature database (DB) is built in the measurement device of FIG. 10 (which is implementable in various forms such as an FOD embedded system, a PC, a laptop computer, a server computer, and an embedded processor embedded in a charger), or a separate temperature DB is connected so that a temperature change value may be stored when the FO is not present, and in comparison with a currently measured temperature value, the presence or absence of the FO and/or a position of the FO may be determined.

In addition, a method of generating a learning model by performing machine learning on the basis of pieces of pre-measured temperature data when the FO is present or is not present and inferring the presence or absence of the FO and/or the position of the FO from a currently measured temperature value on the basis of the learning model may be employed.

That is, in the third embodiment of the present disclosure, the FO is detected on the basis of a temperature change of the transmitter coil (or the balanced coil).

The FOD method based on temperature change may be used with or without the balanced coil.

For example, the temperature value measured by the temperature sensor is used for two purposes of temperature correction of the balanced coil and FOD on the basis of the temperature change, and a final FOD result may be derived in consideration of the FOD result on the basis of the balanced coil together with the FOD result on the basis of the temperature change.

On the other hand, when the FOD on the basis of the balanced coil is not accurately detected due to misalignment of the transmitter and the receiver, whether the FO is detected may be determined only using the FOD result on the basis of the temperature change, or the FOD may be performed only using the temperature sensor embedded in the transmitter without employing the balanced coil.

Meanwhile, in a technology for detecting an FO between the power transmitter and the receiver by detecting a charging environment change in the wireless power transfer, according to a method in the related art, the FO is sensed by amplifying a small change in inductance L by an amplifier using the balanced coil and converting the amplified small change into a voltage, whereas in the present disclosure, a method of measuring the amount of change in voltage across both ends of a Maxwell bridge circuit. Furthermore, the present disclosure is different from the technology according to the related art in that the FO is recognized by finding the maximum resonant frequency, in which a metal reacts, using resonant frequency sweeping in the bridge circuit.

In the present disclosure, for optimal FOD in a wireless charging transmission/reception environment with a predetermined separation distance, a structure capable of resonant frequency sweeping in a balanced coil structure having a Maxwell bridge circuit capable of detecting even a small value change in inductance L is proposed.

An FOD system in a wireless power transfer system according to the present disclosure includes a balanced coil, which is disposed between a transmitter coil and a receiver coil and which includes a Maxwell bridge circuit, and a processor configured to determine whether an FO is present between the transmitter coil and the receiver coil on the basis of voltage values detected at both ends of the bridge circuit.

In addition, an AC generator for generating a separate input AC signal may be further included in the balanced coil. In this case, since an AC signal is generated by generating a relatively high frequency, the FO may be recognized regardless of a size or type thereof. In addition, by measuring a voltage difference while changing an AC frequency applied to the balanced coil, the FOD may be accurately detected with higher reliability, and furthermore, a type of the FO may also be identified.

Figure 13:
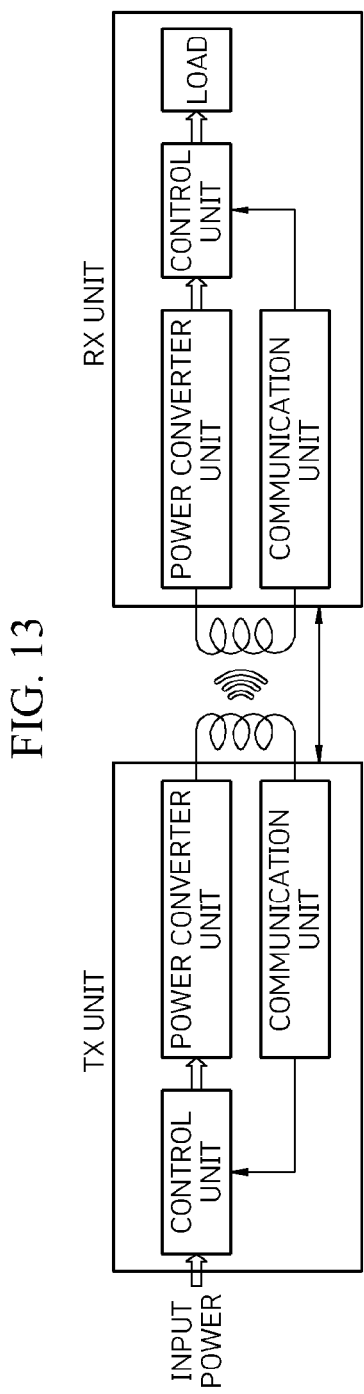
FIG. 13 is a block diagram illustrating a general wireless power transfer system.

FIG. 13 shows a conventional general system for transferring electrical energy to a space in wireless power transfer. A transmitter generates AC power through a power conversion circuit, forms a magnetic field through a transmitter coil to transmit power to a space. A receiver converts the power received through a receiver coil into a DC power through a rectifier and transfers the DC power to a load. Since the transmitter coil and the receiver coil are not in contact, the transmitter and the receiver are physically separated by a predetermined distance.

Figure 14:
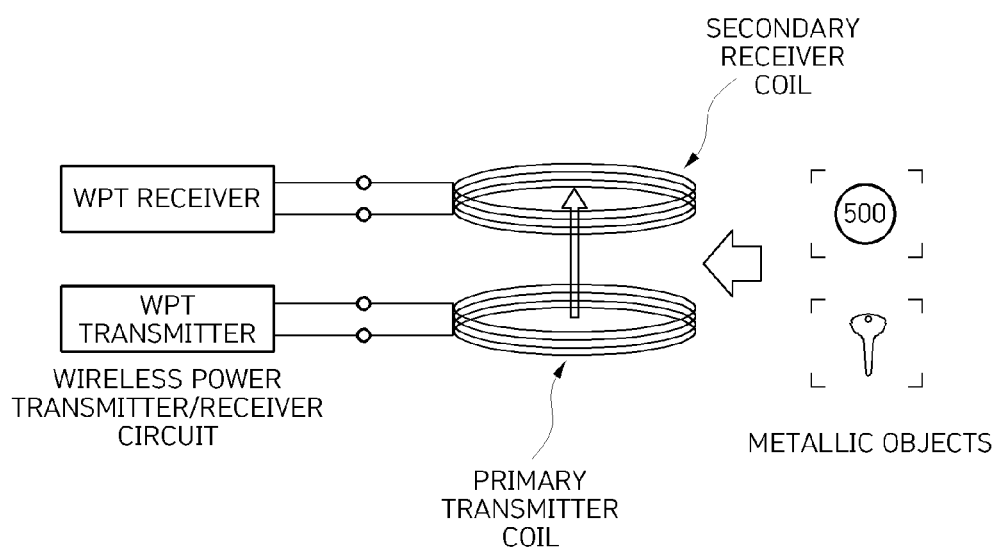
FIG. 14 is an exemplary view illustrating a case in which metallic FOs are inserted between a wireless power transmitter and a wireless power receiver.

As shown in FIG. 14, a problem is that, when a metallic FO is inserted between the transmitter coil and the receiver coil in a separated space, an eddy current is generated, and thus, as impedance and inductance change, distortion of a magnetic flux occurs.

Figure 15A:
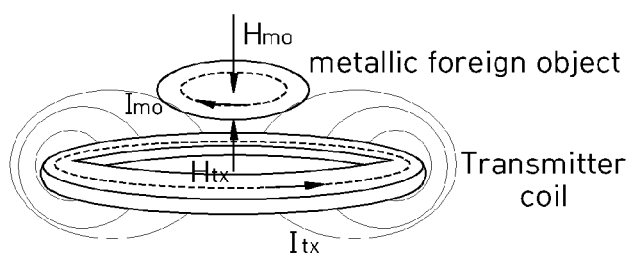
FIGS. 15A and 15B are equivalent circuit diagrams when FOs are inserted above a transmitter coil.
Figure 15B:
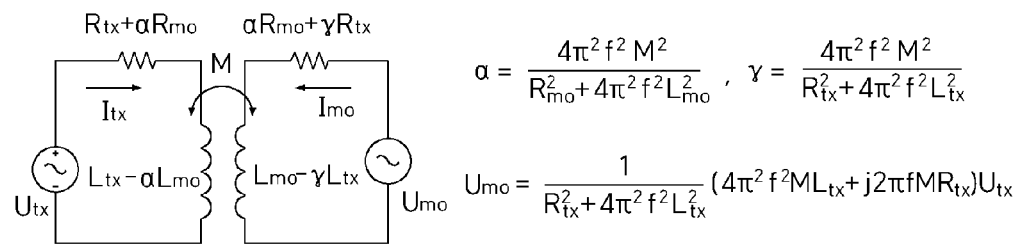

As shown in FIG. 15A, an equivalent circuit when the metallic FO is positioned above the transmitter coil is analyzed as follows. In the equivalent circuit as shown in FIG. 15B, Ltx and Rtx denote the inductance and resistance of the transmitter coil, respectively, and Lmo and Rmo denote the inductance and resistance of the metallic FO, respectively. Itx denotes the current flowing through the transmitter coil, M denotes the mutual inductance between the transmitter coil and the metallic FO, and Utx denotes the AC power of the transmitter system.

When the metallic FO is not present, the impedance $Z_{tx}$ of the transmitter circuit may be expressed as follows.

$$Z_{tx} = R_{tx} + j2\pi f L_{tx} \qquad \text{[Equation 2]}$$

Here, f denotes a frequency of the AC power Utx.

However, when the metallic FO is inserted, the impedance Z'tx of the transmitter circuit changes as follows.

$$Z'_{tx} = (R_{tx} + \alpha R_{mo}) + j2\pi f(L_{tx} - \alpha L_{mo}) \qquad \text{[Equation 3]}$$

$$\alpha = \frac{4\pi^2 f^2 M^2}{R_{mo}^2 + 4\pi^2 f^2 L_{mo}^2} \qquad \text{[Equation 4]}$$

As can be seen from Equation 3, a real number part (R part) of the impedance of the transmitter coil is increased, and an imaginary number part (L part) thereof is decreased. As a result, when the metallic FO is inserted between the transmitter coil and the receiver coil, the inductance of the transmitter coil is decreased, and the resonant frequency of the transmitter is changed so that power transfer efficiency is rapidly degraded. In addition to a thermal hazard due to the eddy current resulting from the metallic FO, the conductivity of the transmitter coil is increased and thus heat is generated so that serious damage such as a failure of the transmitter circuit or a fire is caused. For this reason, the metallic FOD technology is very important in high-power wireless power transmission.

Figure 16A:
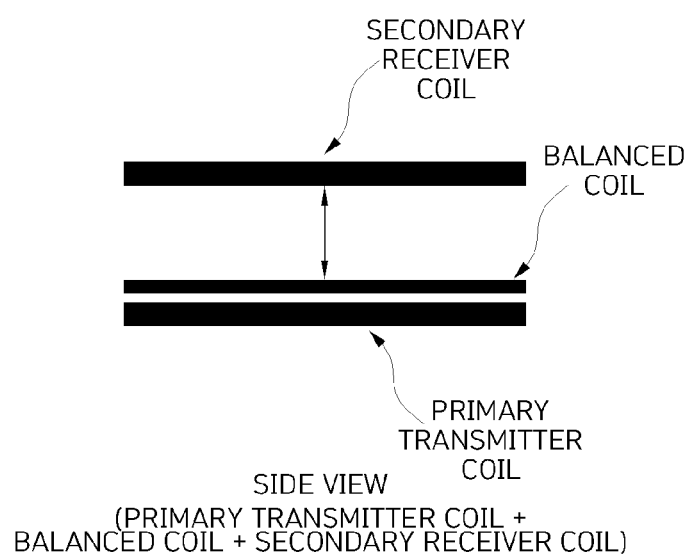
FIGS. 16A and 16B are diagrams illustrating a position and a structure of a balanced coil according to the present disclosure.
Figure 16B:
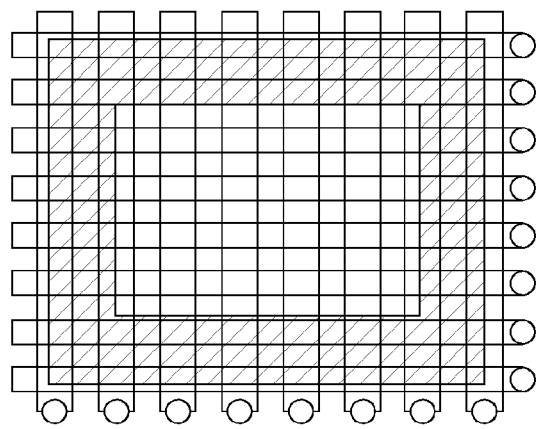
Figure 17A:
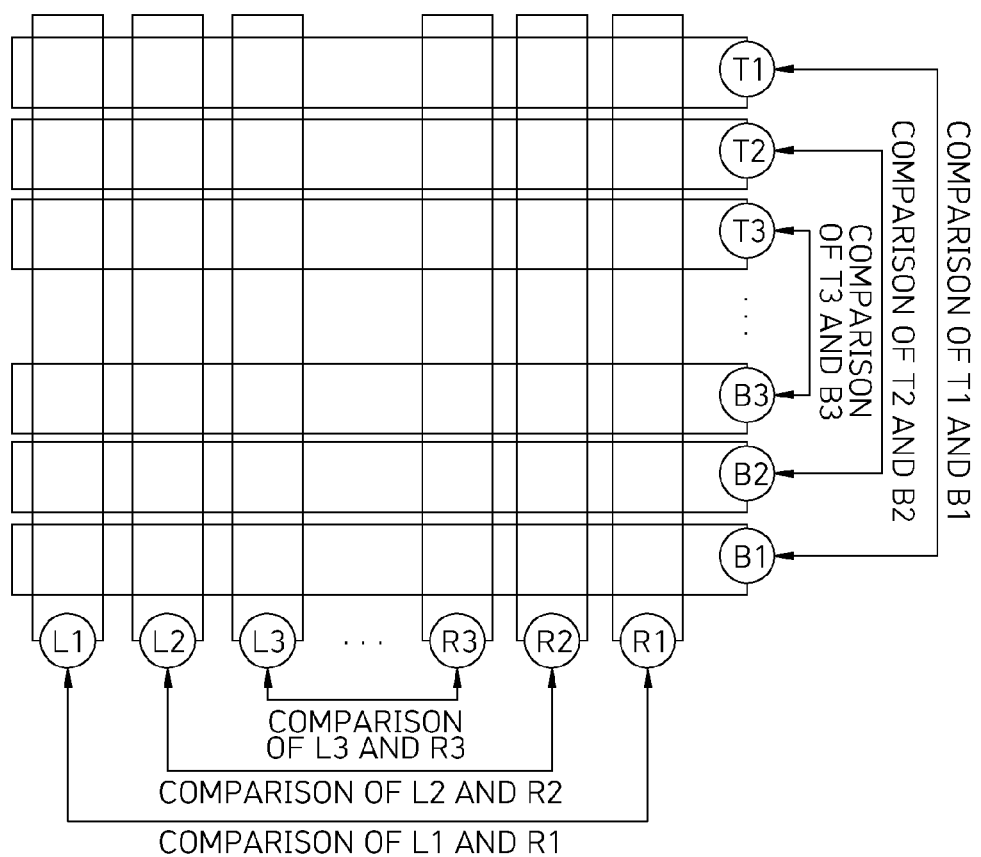
FIGS. 17A and 17B are diagrams illustrating an arrangement of the balanced coil according to the present disclosure (left) and a comparative example (right) when FOs are inserted.

In the recent wireless charging case, the balanced coil is proposed to detect an FO. As shown in FIGS. 16A and 16B, in the balanced coil, a plurality of unit coils L1, L2, L3, . . . , R3, R2, and R1 and T1, T2, T3, . . . , B3, B2, and B1 are placed at an upper end of a primary transmitter coil and are disposed in the form of a matrix. As shown in FIG. 17A, an operation method is performed such that L1 and R1, L2 and R2, and L3 and R3 are symmetrically disposed, T1 and B1, T2 and B2, and T3 and B3 are symmetrically disposed, and the amount of change in the inductance L is measured. Initial compensation is performed on coils compared to each other to be in balance with each other.

Figure 17B:
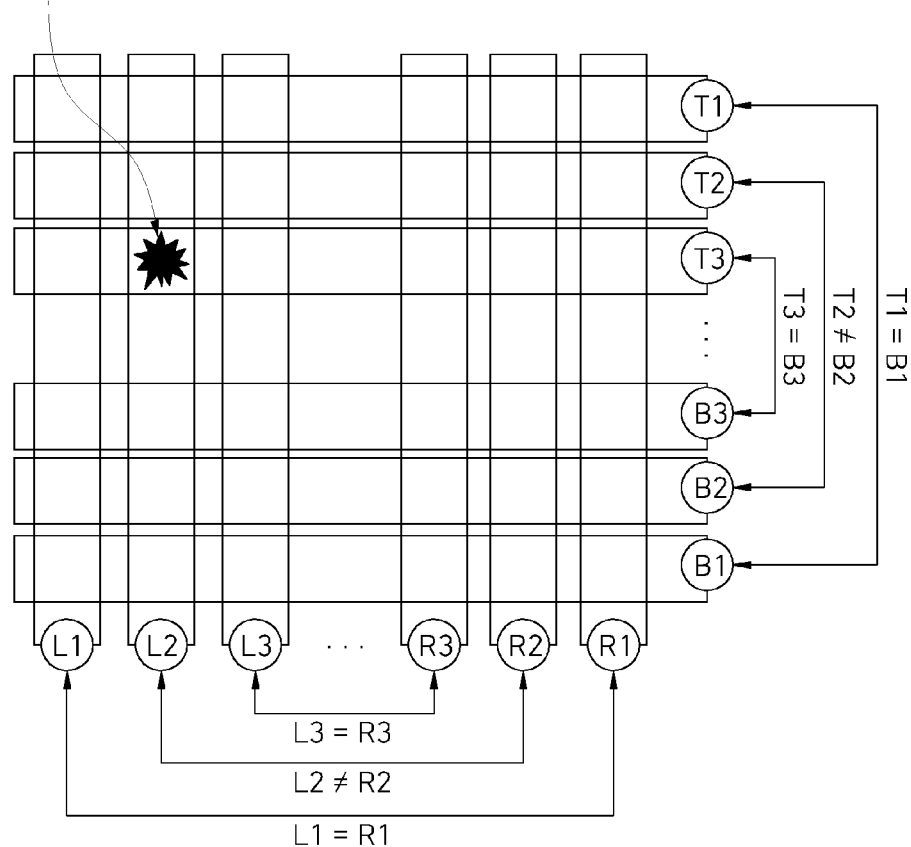

In this situation, as shown in FIG. 17B, when a metallic FO is inserted into a position of L2 and T3, a balance between L2 and R2 is distorted, and a balance between T3 and B3 is distorted. The FOD method using the balanced coil is a method of determining even a position of the FO when an unbalanced phenomenon and an unbalanced coil are found.

Generally, the balanced coil resonates with a magnetic flux formed in a primary transmitter coil to induce a voltage. The balanced coil has a structure for determining the presence or absence and the position of the FO by measuring a voltage difference between symmetric coils. However, in the FOD detection technique using the balanced coil, when a size of the FO is small, an induced voltage is also very small. Therefore, there is a problem in that the FO cannot be accurately detected.

A case of amplifying a very small voltage difference using an amplifier and detecting the voltage difference is common. However, since even noise is amplified, it is difficult to measure an accurate value.

Thus, in an exemplary embodiment of the present disclosure, a balanced coil structure having a Maxwell Bridge circuit capable of detecting even a small change in the inductance L value is proposed. The Maxwell bridge circuit is a type of a Wheatstone bridge circuit which is typically used to measure unknown inductance (generally, a low Q value) using corrected resistance and corrected inductance or resistance and capacitance.

Figure 18:
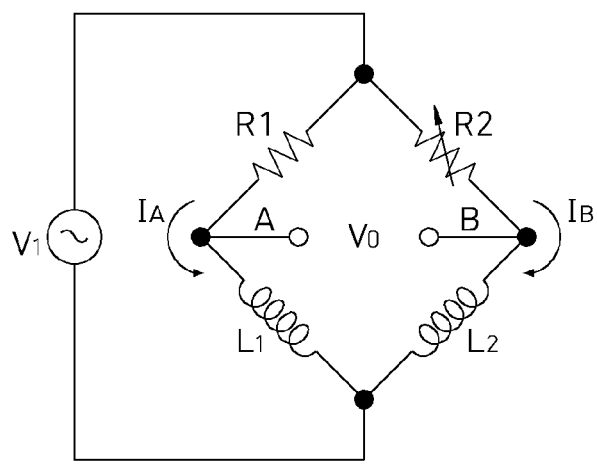
FIG. 18 is a structural diagram illustrating a Maxwell bridge to be applied in the present disclosure.

The Maxwell bridge circuit has a structure as shown in FIG. 18. A high-precision voltmeter $V_O$ (in which a zero point is positioned in a center) is installed in the center of the bridge circuit. When a pointer of the voltmeter is not biased in any direction and is positioned at the center (zero point), the bridge is balanced.

In FIG. 18, voltages and currents applied to L1 and Lx may be expressed as follows.

$$\frac{V_{R1}}{V_{L1}} = \frac{V_{R2}}{V_{Lx}}, \frac{I_A R_1}{I_A 2\pi f L_1} = \frac{I_B R_2}{I_B 2\pi f L_x}$$ [Equation 5]

Therefore, to obtain Lx, Lx may be expressed as a ratio of R2, R1, and L1 as follows.

$$L_x = \frac{R_2}{R_1} \cdot L_1$$ [Equation 6]

In the present disclosure, as shown in FIG. 19, a mutually symmetric balanced coil is used as the inductance of the Maxwell bridge circuit.

That is, each Maxwell bridge, and Ln and Rn and Tm and Bm of a pair of each unit coil on a lower surface and a side surface of the balanced coil are electrically connected and used. It is a system for determining that an FO is inserted, when a voltage difference between V1–V2 of each pair is changed more than a predetermined threshold value by Ln and Rn on the lower surface and Tm and Bm on the side surface.

In the case of an input AC power of the Maxwell Bridge circuit, two methods may be used as follows.

The first method may generate an AC power at a frequency at which the wireless power transmitter transmits power. The balanced coil determines an FO using a voltage induced by a magnetic field of the transmitter. However, due to a low frequency of 85 kHz, this method has a disadvantage in that it is difficult to detect a low value of the inductance L due to an FO.

The second method is a method of generating a separate input AC power at the balanced coil. In this case, since an AC power is generated by generating a signal at a relatively high frequency, even a small change in inductance L due to the FO is recognizable. In addition, this method is effective even when the wireless power transmitter is not transmitting power.

Figure 20A:
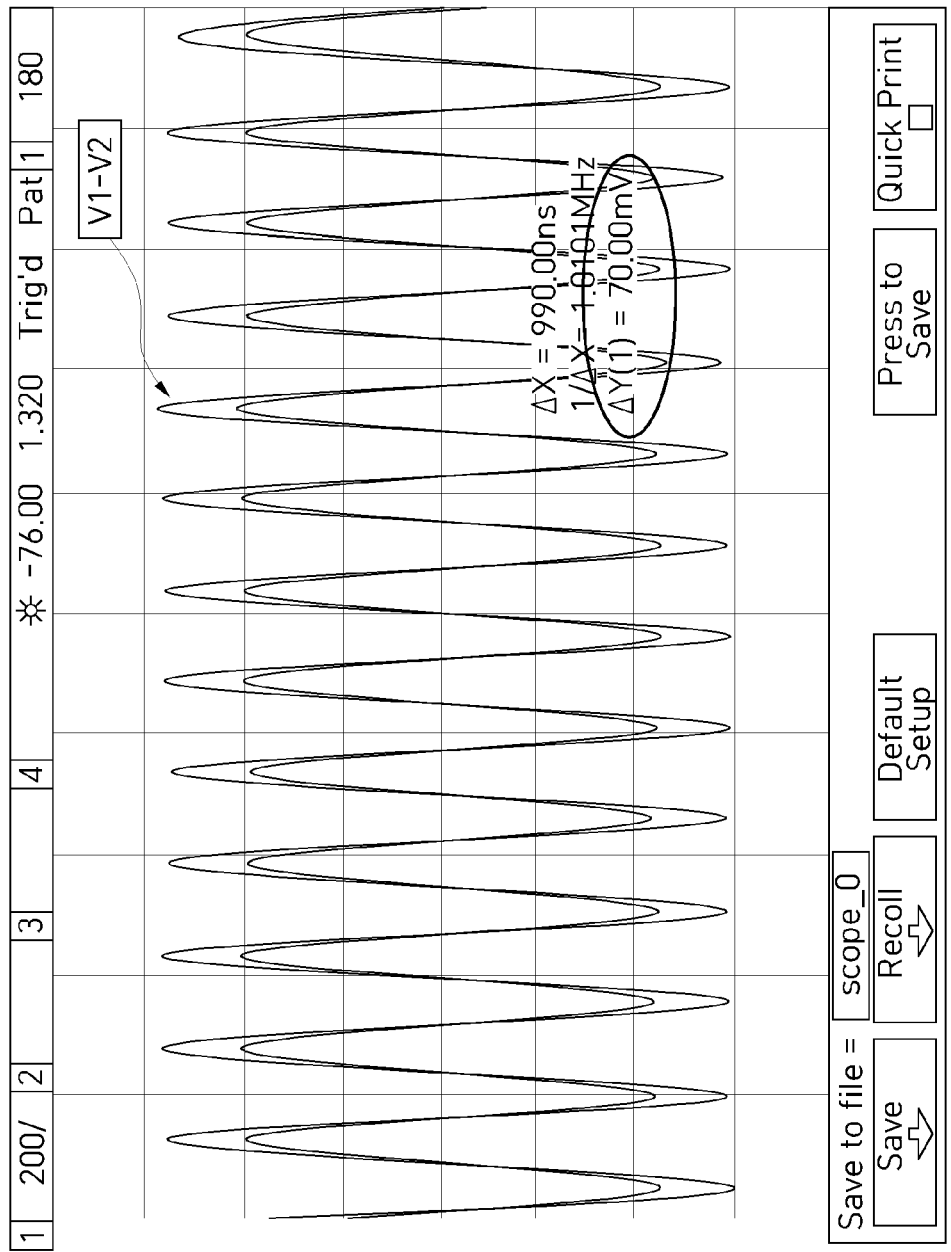
FIGS. 20A and 20B are diagrams illustrating a measurement comparison of a general structure (left) and a proposed structure in the present disclosure (right).
Figure 20B:
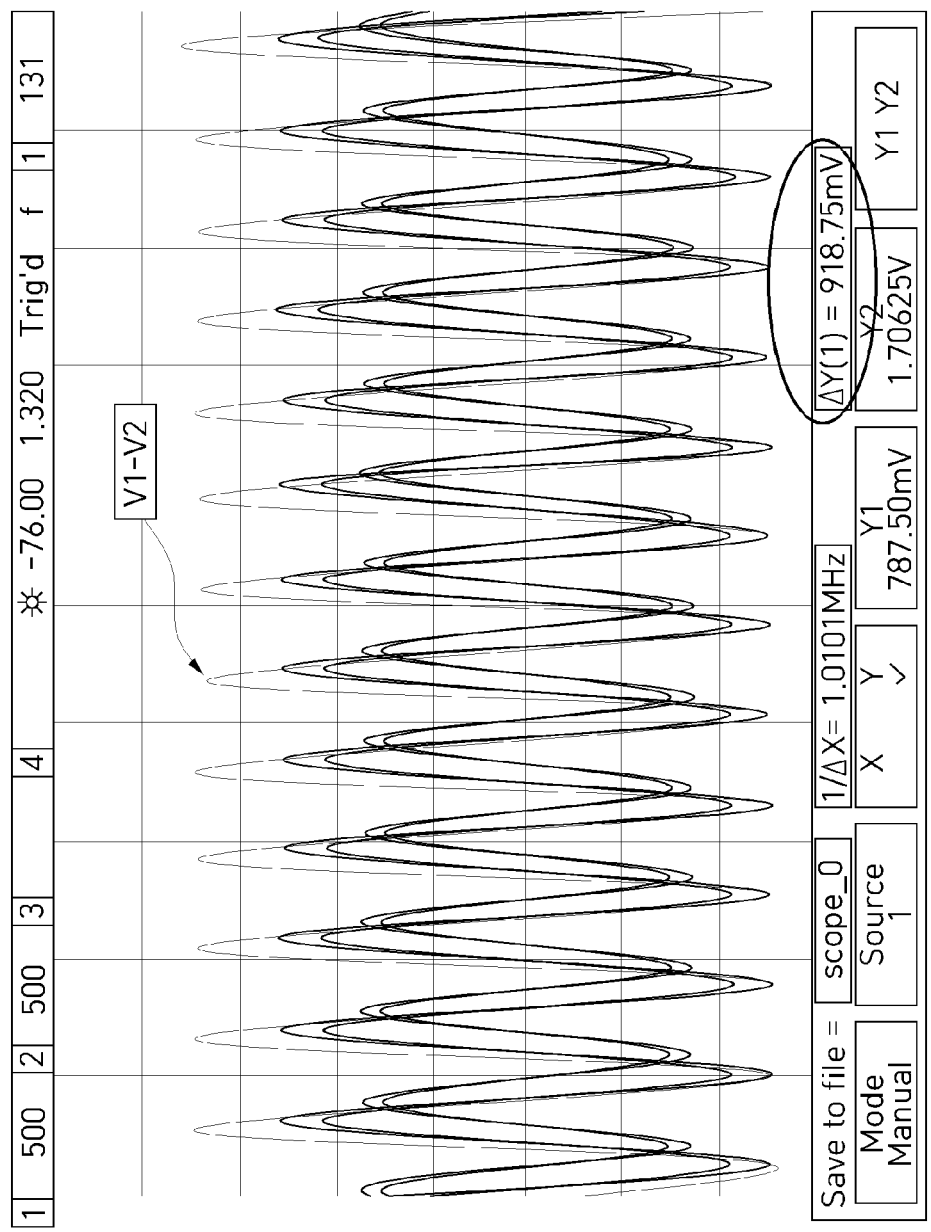

FIGS. 20A and 20B show measured values obtained by comparing a case of using the Maxwell bridge circuit proposed in the present disclosure with a case of not using the Maxwell bridge circuit. Upon measurement using the Maxwell bridge circuit, a voltage change of about 13 times occurs when compared with substantially the same FO.

FIGS. 20A and 20B show ΔV (V1–V2) when AC power of FIG. 19 is applied at 1 MHz.

However, a difference in ΔV varies according to a type of FO and an input AC of the Maxwell bridge circuit.

Figure 21:
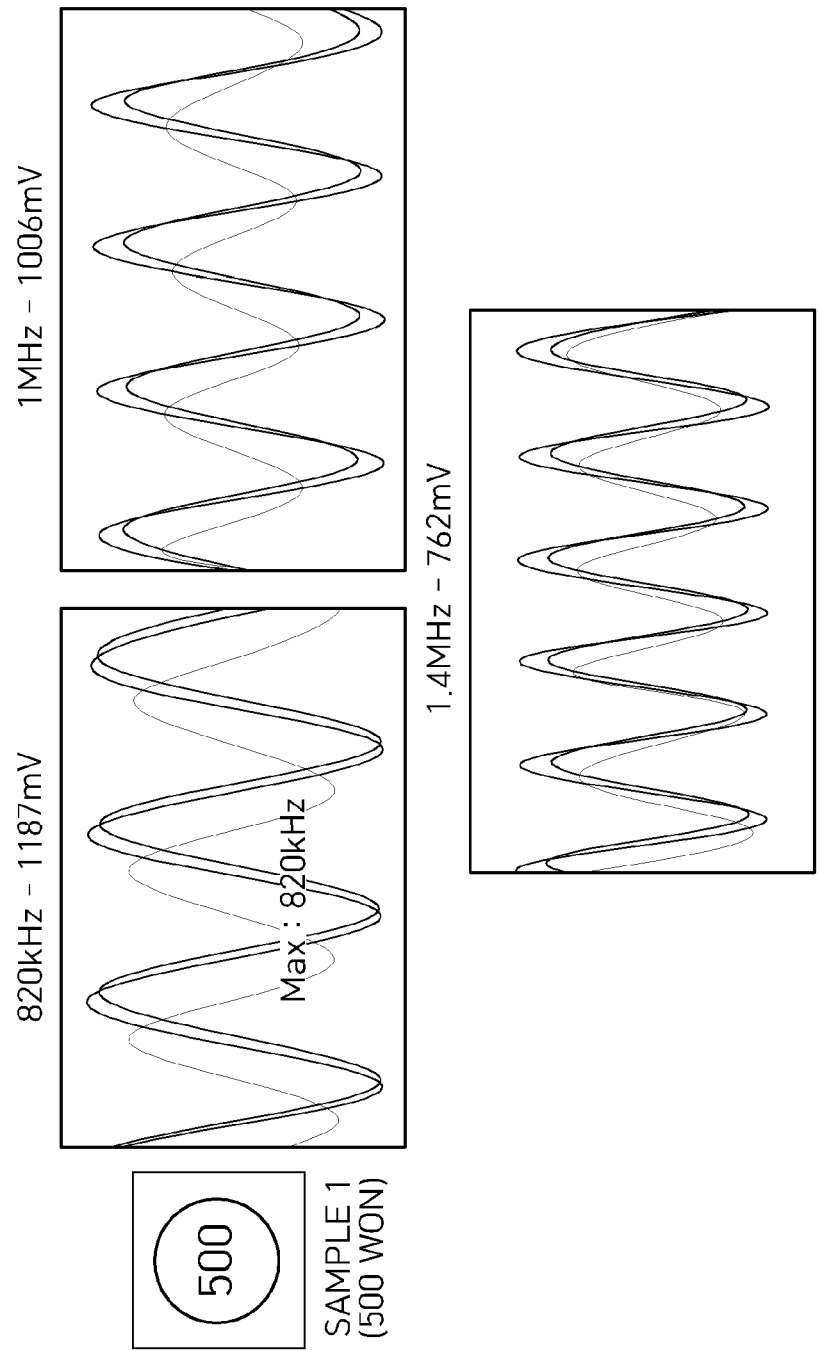
FIG. 21 shows waveform diagrams illustrating a voltage of the detection system according to the present disclosure when an FO is a coin.
Figure 22:
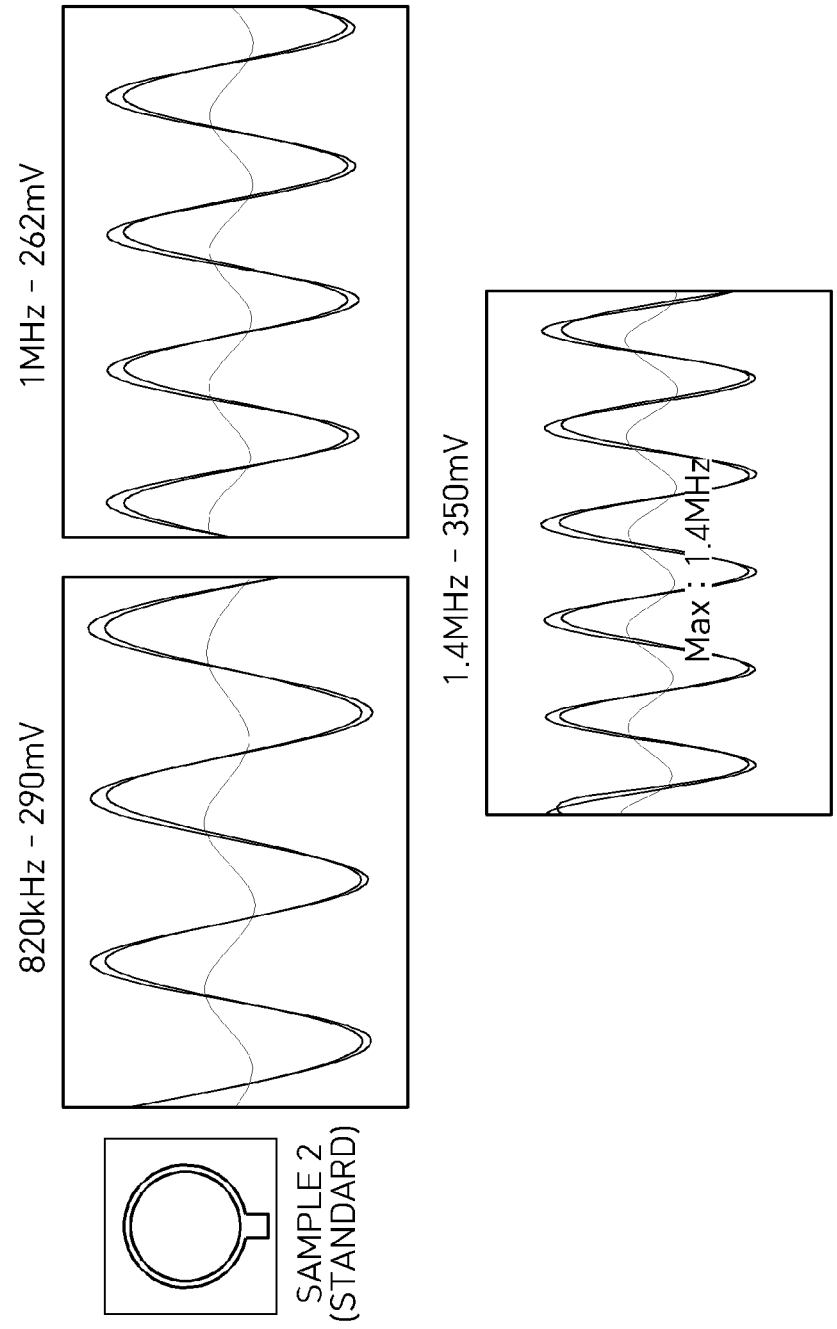
FIG. 22 shows waveform diagrams illustrating a voltage of the detection system according to the present disclosure when an FO is a wireless Power Consortium (WPC) FOD standard sample.

FIGS. 21, 22 and 23 are graphs of ΔV (V1–V2) measured according to an input AC voltage of the Maxwell bridge circuit when types of FOs are a 500 won coin of Korean currency, a WPC FOD standard sample, and a clip.

The maximum ΔV can be confirmed when the input AC voltage has a frequency of 820 kHz for the 500 won coin, a frequency of 1.4 MHz for WPC FOD standard sample, and a frequency of 1.25 MHz for the clip.

That is, as described above, since the maximum voltage difference differs according to the types of FOs, by measuring the maximum voltage difference while changing a frequency of an AC power, the types of FOs may be identified.

Figure 24A:
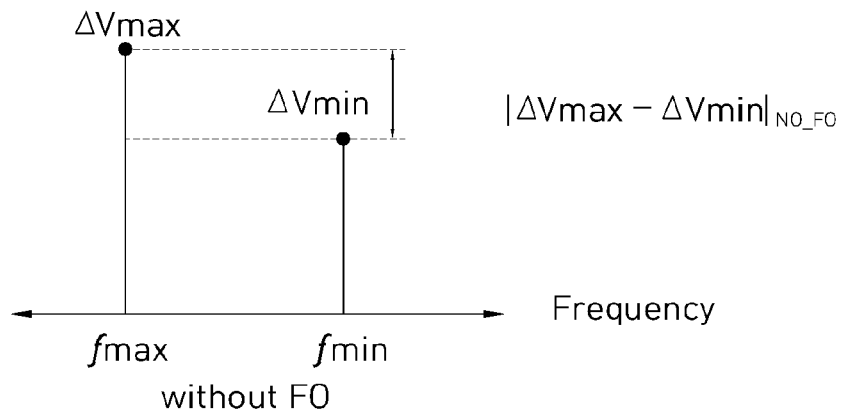
FIGS. 24A-24C show waveform diagrams illustrating a voltage of the detection system according to the present disclosure when an FO is present as a coin and is not present.
Figure 24B:
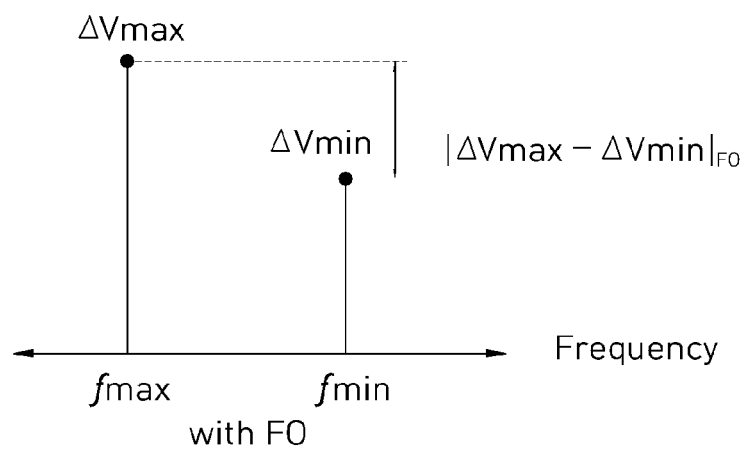
Figure 24C:
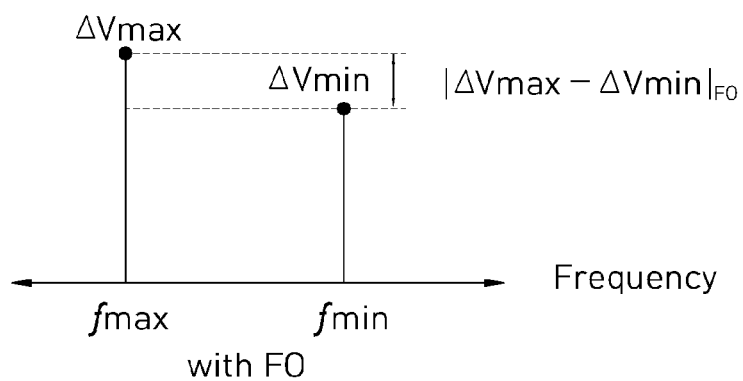

FIGS. 24A-24C show diagrams illustrating ΔVmax and ΔVmin when the FO is present and is not present. When an AC input is changed, a frequency fmax at which ΔV becomes the maximum ΔVmax and a frequency fmin at which ΔV becomes the lowest ΔVmin may be found so that |ΔVmax−Δvmin| may be found. The presence or absence of the FO may be measured with a difference between |ΔVmax−ΔVmin|$_{FO}$ when the FO is present and |ΔVmax−ΔVmin|$_{NO\_FO}$ when the FO is not present. That is, a relationship of |ΔVmax−ΔVmin|$_{NO\_FO}$+ΔVth<|ΔVmax−ΔVmin|$_{FO}$ or |ΔVmax−ΔVmin|$_{NO\_FO}$−ΔVth>|ΔVmax−ΔVmin|$_{FO}$ is established.

By employing the above method, it is possible to accurately confirm the presence or absence of the FO with high reliability regardless of the size or type of the FO. In addition, as described above, by confirming an AC frequency at which the maximum voltage difference occurs, the type of the FO may also be identified.

Figure 25:
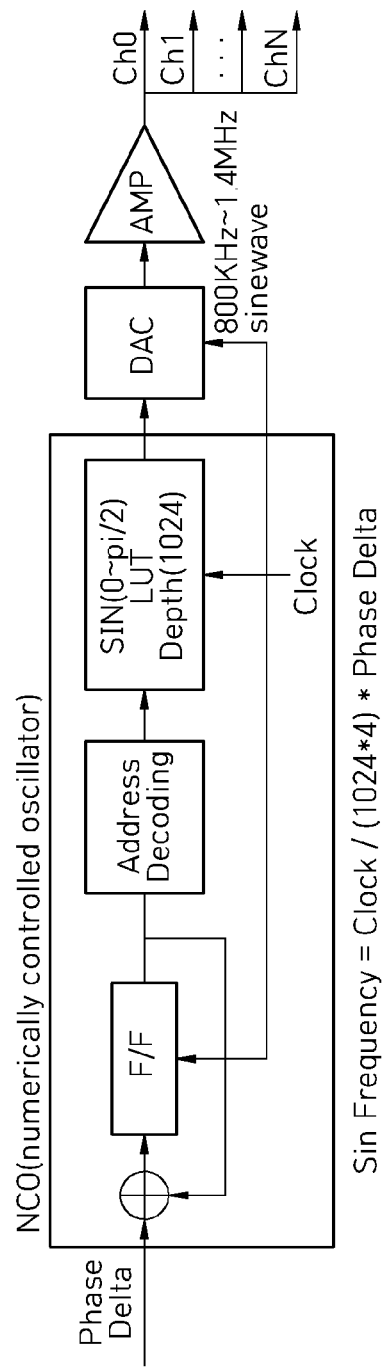
FIG. 25 is a logic circuit diagram for generating an input AC signal according to the present disclosure.

FIG. 25 shows a configuration for generating an AC signal in the Maxwell bridge circuit. The input AC signal may be generated through a numerically controlled oscillator (NCO). The NCO includes a digital integrator, an address decoder, and a sine wave look-up table (LUT) of 0~π/2, and an output of the NCO is generated as an analog sine wave through a digital-to-analog converter (DAC). The analog sine wave is amplified through an amplifier to be input to a channel of the balanced coil.

Although not shown in the drawings, it is natural that the FOD system according to the present disclosure is provided with a determination processor for controlling the AC power source and detecting an FO and determining a type of the FO using the above-described logic on the basis of the voltage value across the both ends of the Maxwell bridge circuit of the balanced coil. The determination processor may be a separate arithmetic device (including a PC, a notebook computer, and a server computer) or may be an arithmetic device built in or attached to the transmitter or the power transmission system.

Figure 26A:
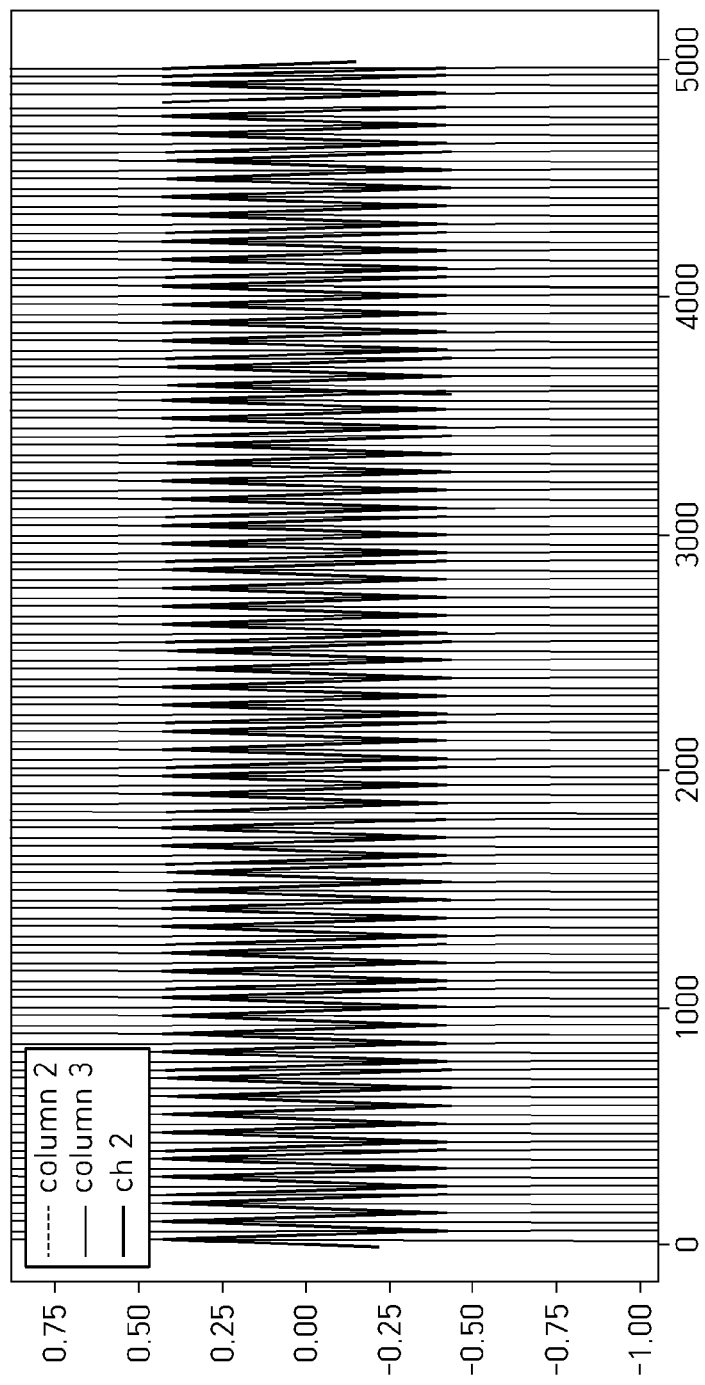
FIGS. 26A and 26B are measurement graphs showing an effect of a temperature on an output voltage of a balanced coil.
Figure 26B:
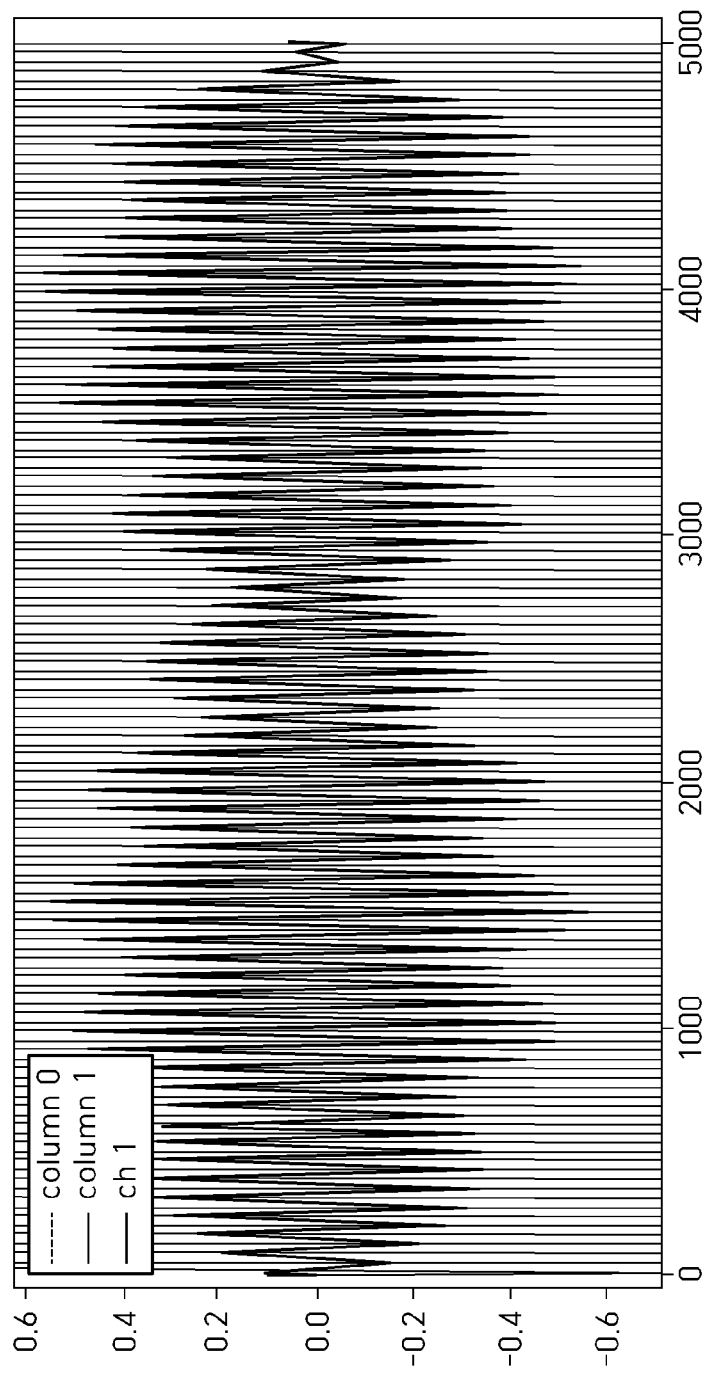

Meanwhile, the amount of change in ΔV measured in the above-described example may be affected by temperature. For example, FIG. 26A is a voltage graph of ΔV and Δ'V (red color) at a room temperature (normal) of 20 degrees, and FIG. 26B is a voltage change graph of ΔV at a temperature of 40 degrees. In the graph, a Y-axis indicates a voltage value, and an X-axis indicates a measurement time (ms).

In consideration of this point of view, as in the following examples, the inventor of the present disclosure has considered an additional configuration for more accurate FO detection.

Referring to FIGS. 26A and 26B in detail, it can be seen that ΔV was measured as 1 V at room temperature (ΔV$_{normal}$=1 V), and ΔV was measured as 12 V at a temperature of 40 degrees (ΔV$_{40}$=1.2 V). Assuming that a value of ΔV is increased as the temperature is increased, when a temperature changes by as much as 20 degrees from a room temperature of 20 degrees to a temperature of 40 degrees, a change in voltage difference $\Delta V_{(normal+20)}$ may be obtained from the following Equation.

$$\Delta V_{(normal+k)} = \Delta V_{normal} + e\Delta V_k \text{ (e=variable, k=changed temperature)} \quad \text{[Equation 7]}$$

Here, a variable e is a variable learned according to the temperature difference, and temperature correction is possible according to the value of e (here, $-1<e<1$).

That is, when a temperature change of the balanced coil (exactly, a transmitter coil which transmits power and of which temperature may be increased) is accurately measured, $\Delta V$ may be corrected so that accurate FOD is possible.

During power transmission, a part where temperature is mainly increased is the transmitter coil (a primary side coil), and thus not only a surface temperature but also a temperature of an FO may be measured when the temperature should be measured at the transmitter coil. However, it is difficult to apply contact-type temperature sensors such as a thermocouple, a resistance temperature detector (RTD), and a thermistor or infrared-type non-contact temperature sensors to the transmitter coil due to electromagnetic interference (EMI). Therefore, it is necessary to apply a temperature sensor not affected by EMI.

In consideration of this point of view, in the present disclosure, a fiber Bragg grating (FBG) optical fiber temperature sensor is used to measure a temperature change of the transmitter coil and a temperature at each position of the balanced coil.

Figure 27A:
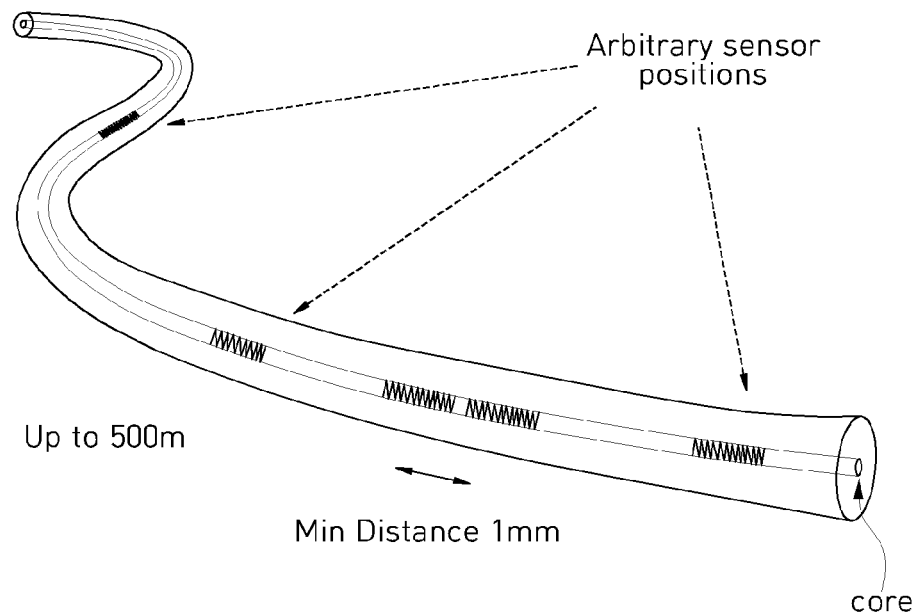
FIG. 27A is an overview diagram illustrating a temperature sensor employed in the present disclosure.

FIG. 27A is a diagram illustrating an FBG optical fiber temperature sensor employed in another embodiment of the present disclosure. The FBG includes a fiber and gratings. A core is present in the center of the FBG fiber optic temperature sensor, the gratings are indicated by red dots in the drawing. The gratings are generated due to an increase in refractive index when a core of an optical fiber core is exposed to ultraviolet rays. Each grating reflects a part of propagating light, and when the reflected light signals are combined, it becomes one large reflection at a specific wavelength, and the specific wavelength is referred to as a Bragg wavelength. A temperature is obtained by detecting the amount of change in Bragg wavelength and calculating the amount of change as the amount of physical change.

As described above, EMI is the most common cause of measurement errors and malfunctions occurring in an electrical sensor system, and in the present disclosure, an optical fiber having little effect on electromagnetic waves may be used to solve the above problem. Since light is a source in the FBG fiber optic temperature sensor, even when a length of a cable is elongated or the cable is affected by an electrical signal, noise and distortion do not occur in a signal.

Figure 27B:
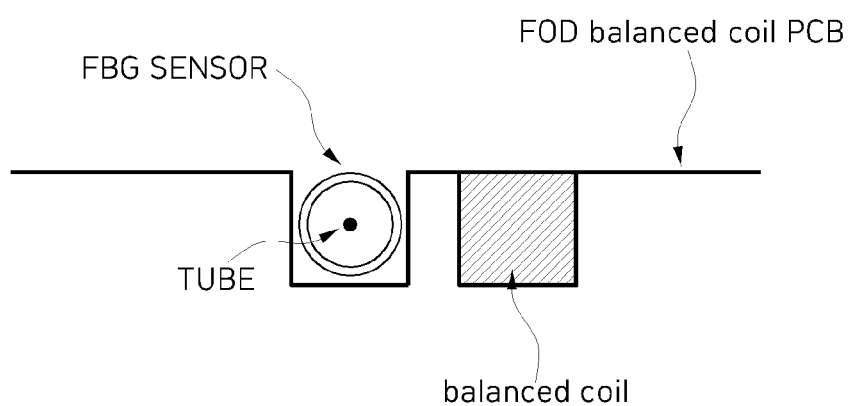
FIG. 27B is an exemplary diagram illustrating a structure applied to the balanced coil in the temperature sensor according to the present disclosure.

FIG. 27B is a cross-sectional view illustrating a structure in which an FGB sensor is embedded in a FOD balanced coil PCB according to another embodiment of the present disclosure. A sensor is embedded in the fiber optic cable, and thus the fiber optic cable itself serves as a sensor. A customized tube is manufactured to protect an optical fiber which is sensitive to strain. The optical fiber is in the form of floating in the tube, and this form is a structure being embedded instead of being attached.

In the present embodiment, the FBG optical fiber temperature sensor corresponds to or is proportional to the number of unit cells of the balanced coil. In a single channel, the maximum number of sensors attachable to one FBG fiber optic cable is 30.

Figure 28A:
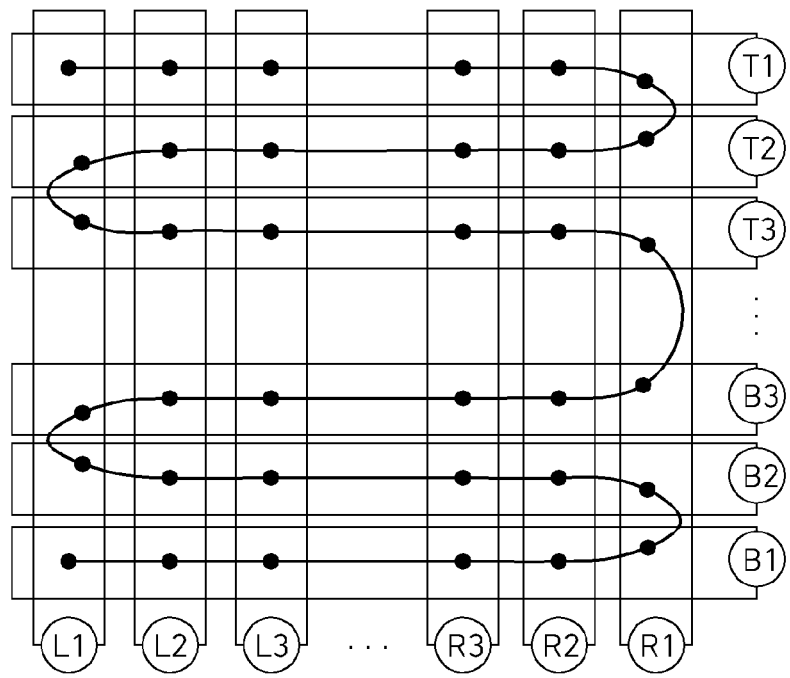
FIGS. 28A-28C are structural diagrams illustrating an example in which a temperature sensor is disposed according to one embodiment of the present disclosure.
Figure 28B:
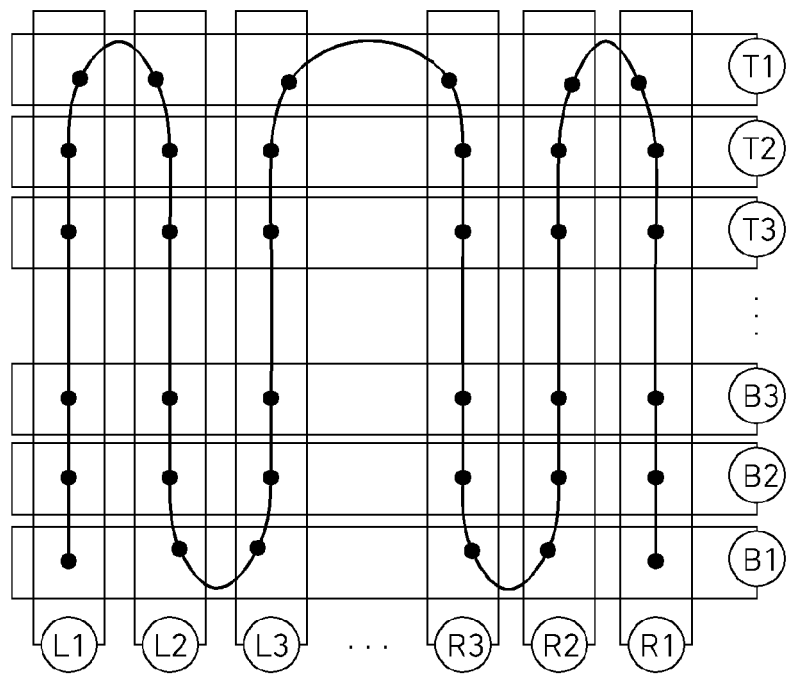
Figure 28C:
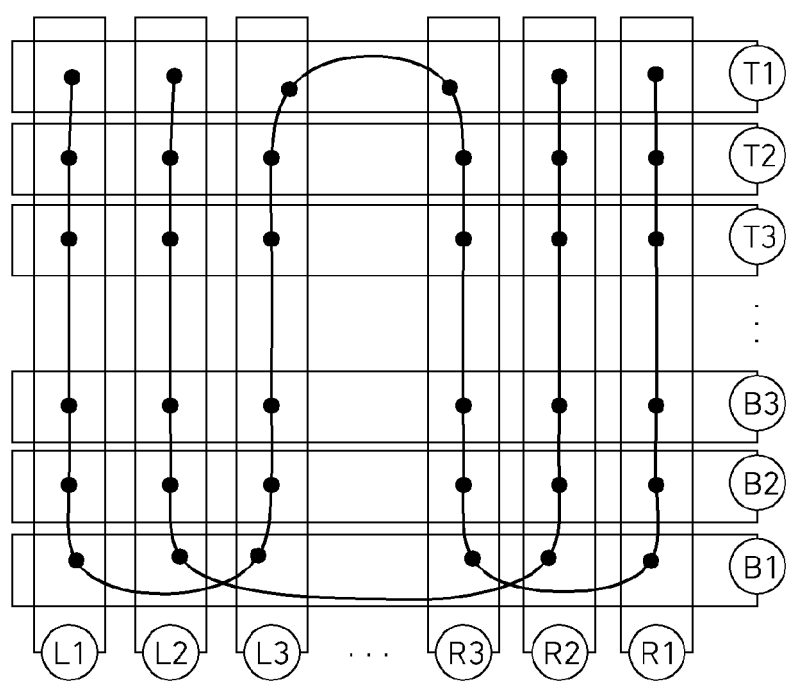

As shown in FIGS. 28A and 28B, the sensors may be installed in a single channel (a single optical fiber) in a transverse direction, a longitudinal direction, or any other direction. However, when more sensors are required or when the channel is to be operated for other purposes, a multi-channel may be selected as shown in FIG. 28C.

Figure 29A:
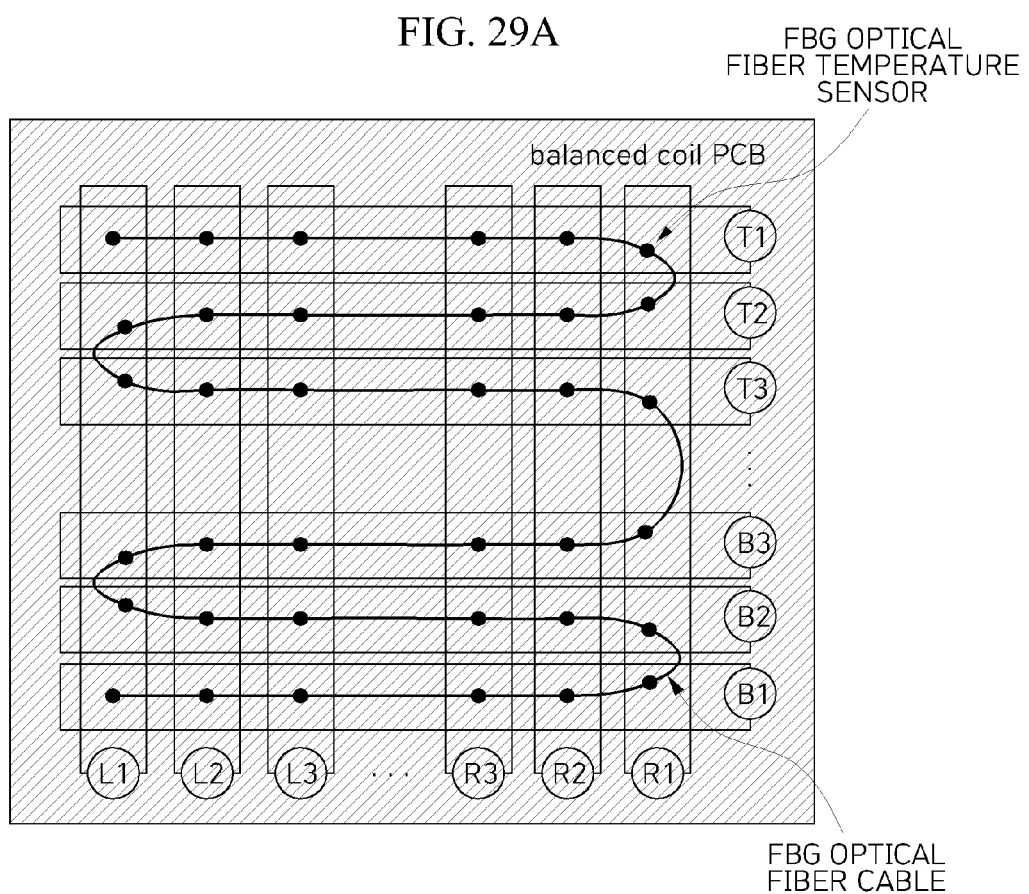
FIGS. 29A and 29B are a structural diagram illustrating an example of a buried position according to one embodiment of the present disclosure.
Figure 29B:
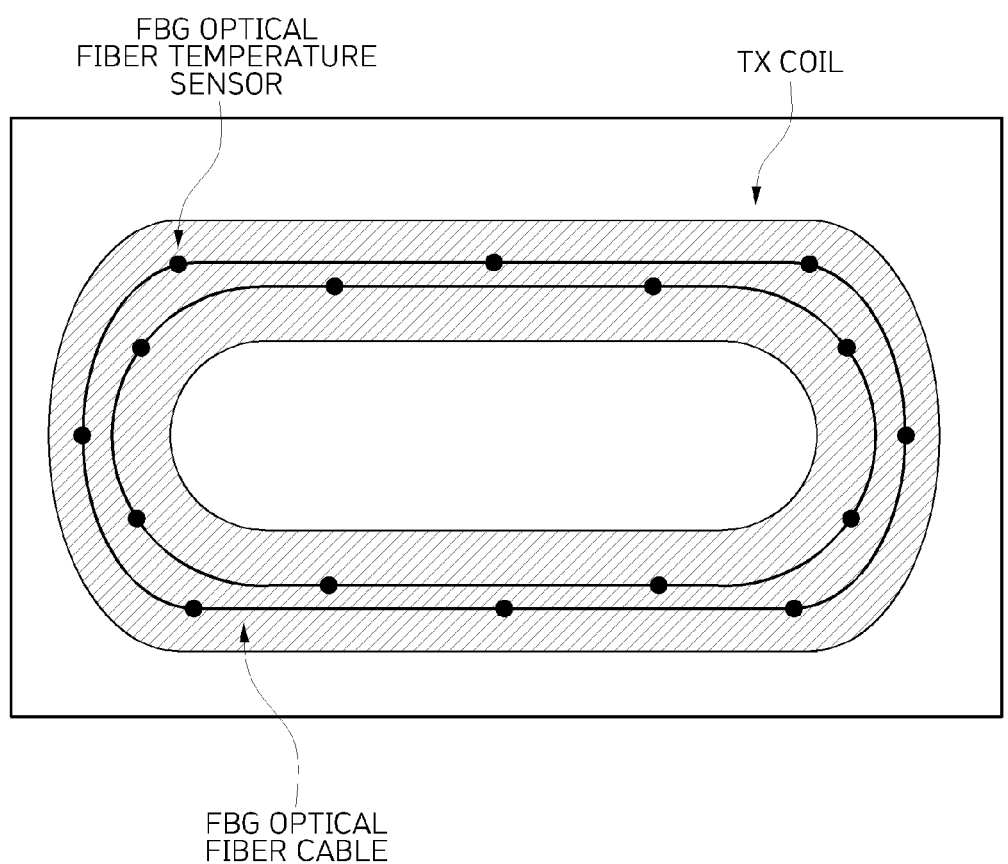

FIGS. 29A and 29B are exemplary view illustrating an arrangement of the FBG optical fiber temperature sensor. The FBG fiber optic temperature sensor is disposed along or in consideration of the balanced coil and the transmitter coil. FIG. 29A is an example in which the FBG fiber optic temperature sensor is embedded in the balanced coil PCB, and FIG. 29B is an example in which the FBG fiber optic temperature sensor is embedded in the transmitter coil (TX coil). The embedding in the transmitter coil means embedding adjacent to or near the transmitter coil, such as between transmitter coils, above the transmitter coil, and below the transmitter coil. When a structure in which the FBG fiber optic temperature sensor is embedded is provided in this way, any pattern embedded below or above the transmitter coil may be applied to any structure. When the flexibility of the FBG fiber optic temperature sensor and a characteristic in which the sensor is freely disposed are used, it is possible to attach the FBG fiber optic temperature sensor to any coil of any structure.

It is natural that a determination processor is provided to perform correction according to temperature and detect an FO on the basis of temperature values of the transmitter coil and/or the balanced coil, which are measured using the above structure. The determination processor may be a separate arithmetic device (including a PC, a notebook computer, and a server computer) or may be an arithmetic device built in or attached to the transmitter or the power transmission system.

Generally, a laser light source outputs a coherent beam which intensively extracts energy accumulated in atoms or molecules. Typical laser light has a single color, that is, one wavelength or color. Therefore, generally, the laser beam has characteristics of being thin and not spreading. For FOD in fields such as wireless power transfer, it is necessary to generate a specific pattern of a large area from a laser light source which scans light in the form of a point. This is because a size of a transmitter coil (a primary coil) for power transmission is tens of cm×tens of cm or more.

Figure 30A:
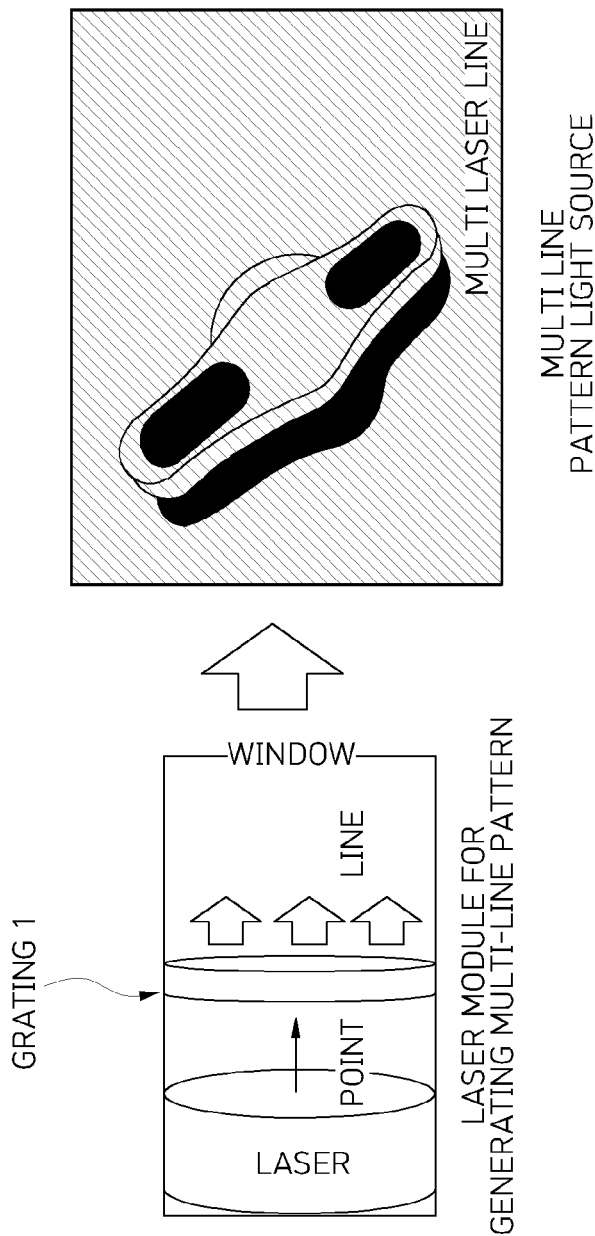
FIG. 30A is an exemplary diagram illustrating a multi-line pattern light laser module and a multi-line pattern.
Figure 30B:
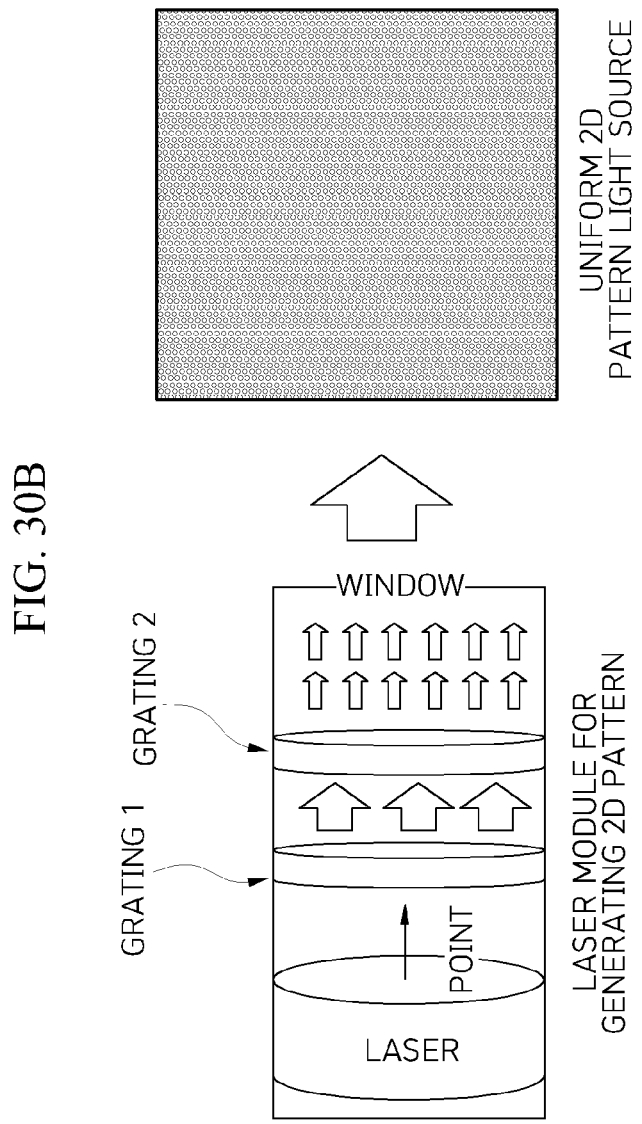
FIG. 30B is an exemplary diagram illustrating a two-dimensional (2D) pattern light laser module and a 2D pattern.

To this end, in the present disclosure, a diffraction grating filter is used to expand point-shaped laser light into large-area pattern light. FIGS. 30A and 30B show a structure of a laser light source in the FOD system according to the present disclosure in wireless power transfer.

FIG. 30A is an exemplary diagram illustrating a laser module including a diffraction grating 1 for converting point light of a laser into multi-line pattern light, and the multi-line pattern light scanned through a window. FIG. 30B is an exemplary diagram illustrating a laser module in which a diffraction grating 2 is additionally included in the diffraction grating 1 to convert the point light of the laser into 2D pattern light in which dots are uniformly disposed, and the 2D pattern light scanned through a window.

Figure 31:
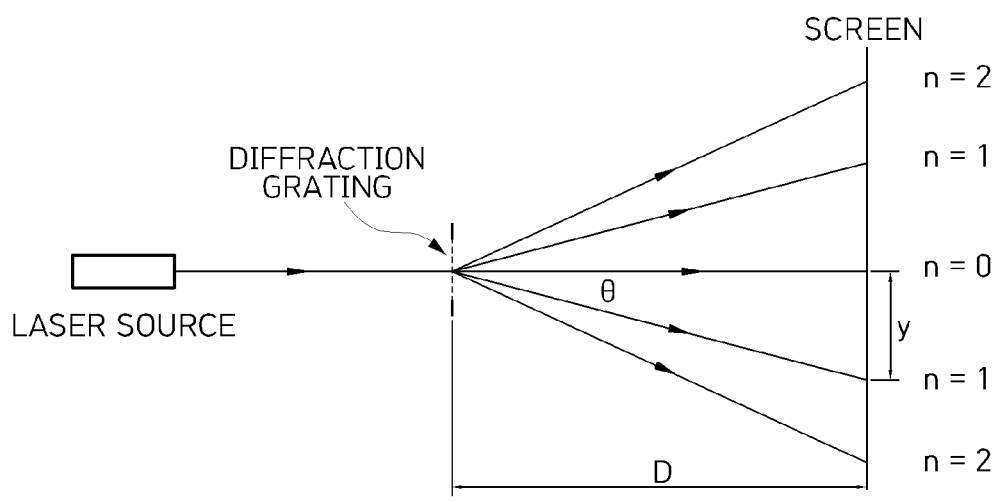
FIG. 31 is a diagram for describing a principle of generating nth order multi-line pattern light from a laser source using a diffraction grating filter.

FIG. 31 shows a principle of generating $n^{th}$ order multi-line pattern light from a laser source using a diffraction grating filter. Here, n satisfies $n\lambda = \sin\theta$. $\lambda$ is a wavelength of the laser light. When the double diffraction gratings are used as shown in FIG. 30B, a 2D pattern may also be generated.

Figure 32:
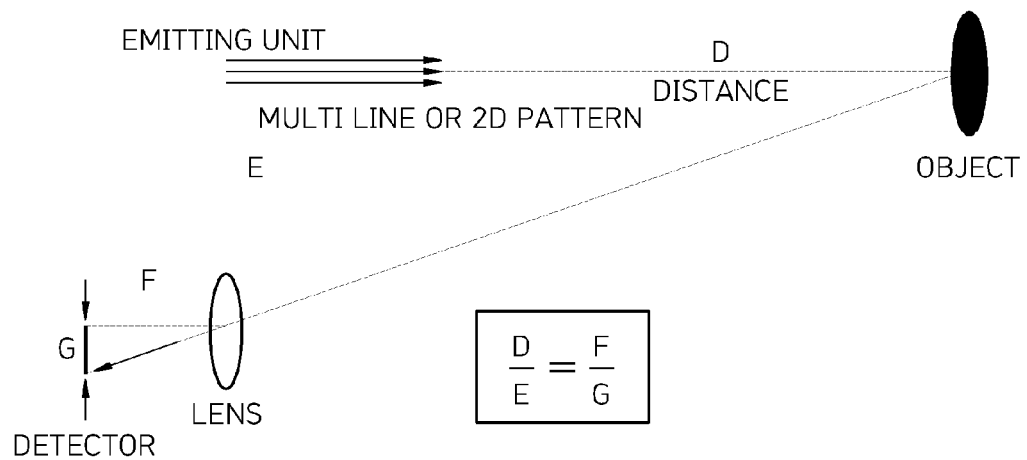
FIG. 32 is a diagram illustrating a relationship between an emitting unit and a detector.

When the laser light source (i.e., an emitting unit) scans dot-shaped light as light of a multi-line pattern or a 2D pattern, a detector needs a camera detector for recognizing the light. FIG. 32 shows a relationship between the emitting unit and the detector. Here, an important part is that the emitting unit and the detector should be horizontally separated by a distance E so that an image in a size of G is formed on the detector.

As described above, the present disclosure is characterized in that the emitting unit is formed in a multi-line or 2D pattern to scan light. The above emitting unit becomes the emitting unit for the FOD of the present disclosure. When an FO (an object in FIG. 32) is inserted between the transmitter and the receiver of wireless power transfer, a predetermined multi-line or 2D pattern is deformed due to the FO. In this case, according to the method of the present disclosure, the detector recognizes the deformed pattern to determine the FO.

To describe in more detail, the FOD device of the present disclosure may store an initial profile grid pattern of the multi-line pattern of the emitting unit and recognize whether the stored multi-line profile pattern is deformed in the image detected by the camera detector, thereby recognizing whether the FO is inserted and a shape of the FO.

In addition, the FOD device of the present disclosure may store an initial pattern of the 2D pattern of the emitting unit (such as a gap between dots, a size, a distribution, luminance, and the like) and recognize whether the stored pattern is deformed in the image detected by the camera detector, thereby recognizing whether the FO is inserted and a shape of the FO.

Figure 33A:
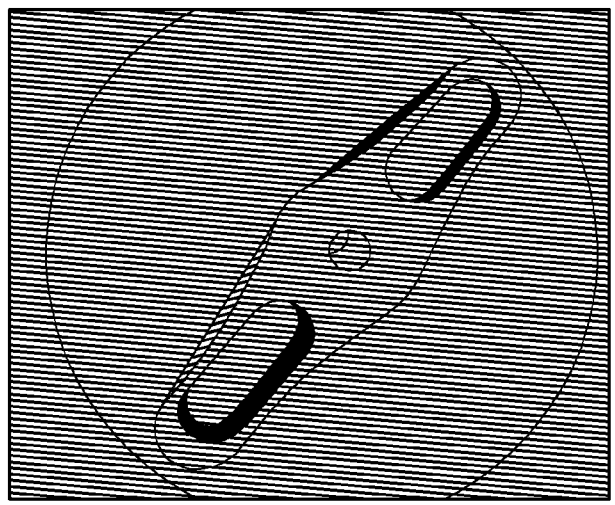
FIGS. 33A and 33B are exemplary diagrams illustrating pattern deformation shown in a detected image of the detector due to an FO.
Figure 33B:
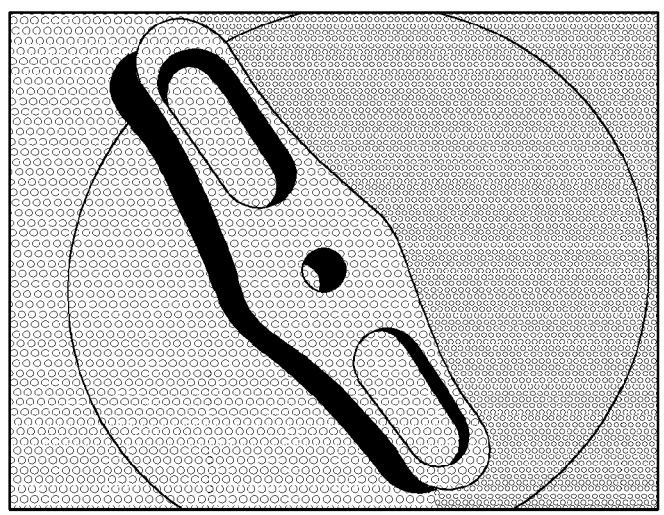

FIGS. 33A and 33B show examples in which patterns shown in detected images of the detector are deformed due to the FO. FIG. 33A shows a deformed pattern due to the FO when the multi-line pattern light is scanned, and FIG. 33B shows a pattern deformed due to the FO when the 2D pattern light is scanned. When the FO is inserted, deformation, in which the pattern disappears or a gap between the patterns is widened, as shown in FIGS. 33A and 33B, occurs in the image of the detector recognizing the predetermined pattern.

Figure 34:
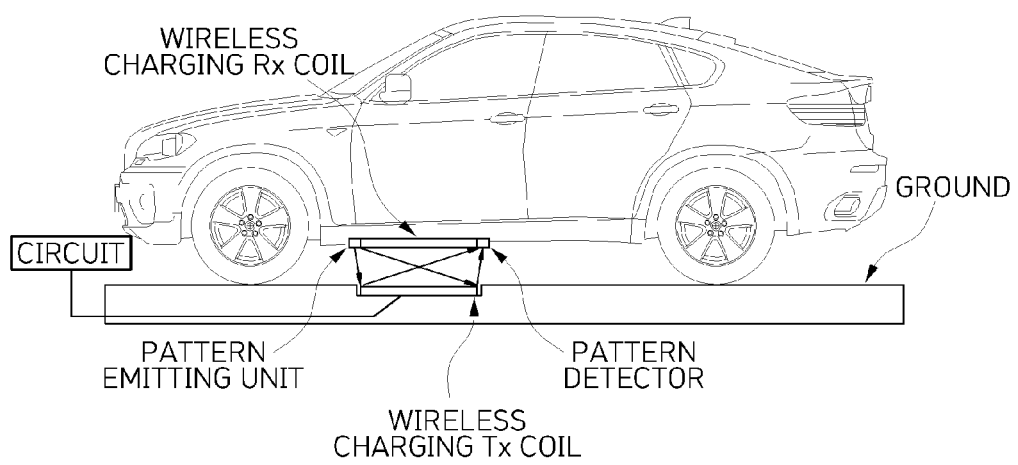
FIGS. 34 and 35 are diagrams for describing vehicle mounting positions of the emitting unit and the detector for wireless charging of an electric vehicle.
Figure 35:
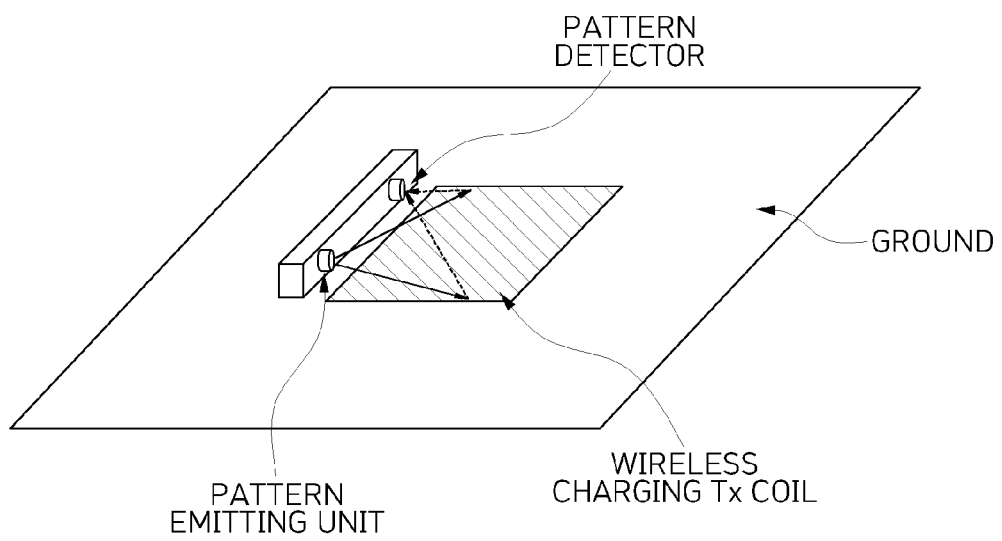

FIGS. 34 and 35 show vehicle mounting positions of the emitting unit and the detector for wireless charging of an electric vehicle. When wireless charging is performed between a wireless charging transmitter (Tx coil) and a wireless charging receiver (Rx coil) and an FO is inserted therebetween, mounting positions of a pattern emitting unit and a pattern detector for detecting the FO will be described according to the present disclosure.

As shown in FIG. 34, the pattern emitting unit and the pattern detector may be mounted on a lower portion of the vehicle body. In this case, it is possible to secure a sufficient lateral separation distance to recognize the FO, and there is an advantage of a structure in which a scanning direction of the emitting unit is directed downward. However, there is a disadvantage in that it is difficult to maintain/manage the emitting unit and the detector.

On the other hand, as shown in FIG. 35, when the pattern emitting unit and the pattern detector are installed on the ground (that is, the charging transmitter side), it is advantageous in terms of maintenance and management of the emitting unit and the detector, but there is a probability that a shadow area may occur in the scanning direction of the pattern emitting unit.

As described above, when compared to the method of detecting the FO using the camera alone according to the related art, the method of detecting the FO using the laser emitting unit and the detector according to the present disclosure may increase detection sensitivity in various aspects.

First, the detection method according to the present disclosure is not affected by illuminance. The camera cannot recognize an object in low illuminance, but in a structure with a separate laser emitting unit, there is a camera detector capable of recognizing a wavelength of a laser of the emitting unit so that recognition is possible without an influence of external illuminance.

Second, the detection method according to the present disclosure is capable of detecting a surface shape of an object. A height of the object cannot be recognized by the 2D camera alone, and when the pattern laser is scanned, a height and a shape of the object may be identified by recognizing a gap between the patterns deformed by the FO.

Meanwhile, when the laser emitting unit scans specific pattern light, an alignment problem between the vehicle and the power transmitter may also be solved. Upon transmission of power, an alignment between a transmitter of the ground side and a receiver of the vehicle is very important. Upon misalignment, energy transfer efficiency is degraded, and the misalignment may also be a cause of circuit failure.

To this end, in the present disclosure, in a situation in which the vehicle and the power transmitter are initially aligned, the pattern of the emitting unit is stored, and by detecting a pattern recognized by the camera detector, alignment between the power transmitter and the vehicle (i.e., a power receiver at a vehicle side) may be predicted. Furthermore, when misalignment occurs, misalignment information may be transmitted to the vehicle.

FIGS. 36A-36D show an example in which an alignment state between a vehicle and a power transmitter (a wireless charging transmitter coil unit) is recognized on the basis of a detected form of the pattern light.

Figure 36A:
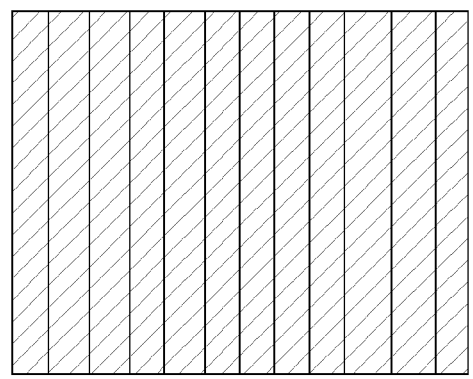
FIGS. 36A-36D are diagrams for describing an example in which an alignment state between a vehicle and a power transmitter (a wireless charging transmitter coil unit) is recognized on the basis of a detected form of the pattern light.
Figure 36B:
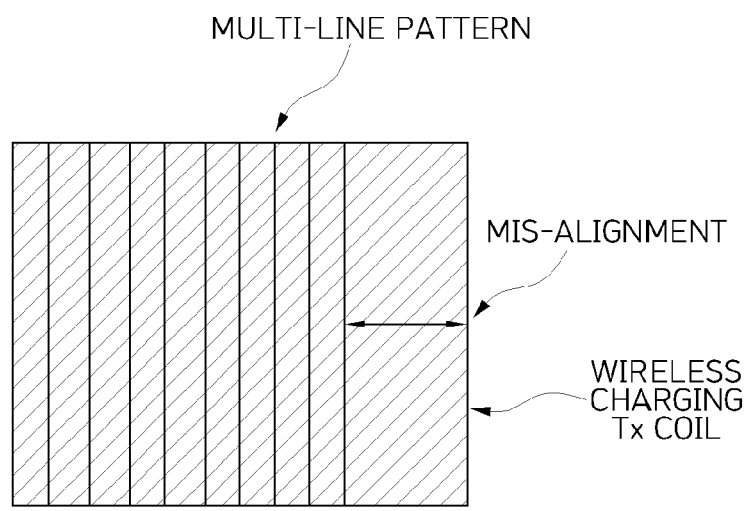
Figure 36C:
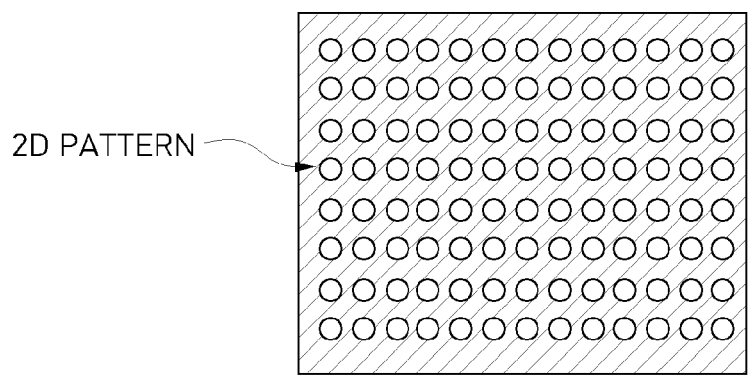
Figure 36D:
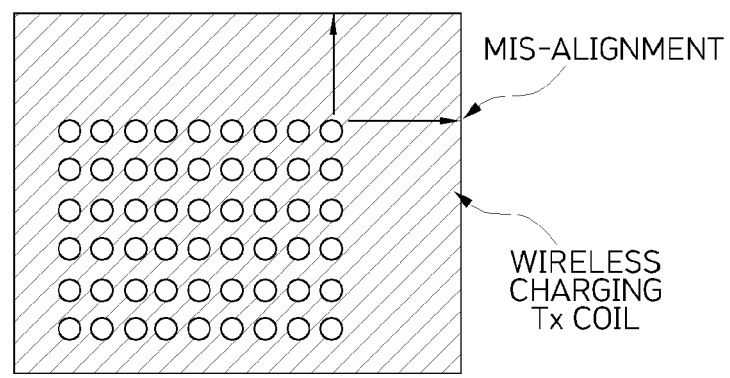

FIG. 36A shows a detected image in a state of alignment during multi-line pattern light scanning, and FIG. 36B shows a detected image in an unaligned state. With reference to the image of the FIG. 36B, it can be recognized that lateral misalignment with a wireless charging Tx coil occurs. FIG. 36C shows a detected image in a state of alignment during 2D pattern light scanning, and FIG. 36D shows a detected image in an unaligned state. With reference to the image of the FIG. 36D, it can be recognized that lateral misalignment with an upper side and a lateral side of the wireless charging Tx coil occurs.

As described above, according to the present disclosure, it is possible to obtain an effect of being capable of recognizing an alignment degree and a misalignment position between the transmitter and the receiver with reference to the pattern image detected by the camera detector.

In accordance with the present disclosure, it is possible to detect a foreign object (FO) with high reliability regardless of a size of the FO.

In addition, it is possible to measure a surface temperature of a transmission coil and a temperature of the FO so that it is possible to accurately correct an output value of a balanced coil with respect to the FO, which is greatly affected by temperature.

As a result, the accuracy of FO detection (FOD) can be improved.

In accordance with the present disclosure, it is possible to improve response sensitivity with respect to metal materials of various shapes and sizes at a resonant frequency.

In accordance with the present disclosure, it can be used as a technology of the FOD or LOD for wireless charging of robots or a moving object (an automated guided vehicle (AGV), an electric vehicle, or the like).

In particular, a distance between a transmitter and a receiver can be varied, and an FOD technology approaching 100% recognition rate can be implemented in various wireless power transfer environments in which various types of FOs are inserted so that stability and safety of wireless charging technology can be secured.

In addition, in accordance with the present disclosure, there is an advantage in that it is very robust to a change in illuminance by scanning a specific pattern using a laser light source, and in particular, even a surface shape of an object can be analyzed with the amount of change in pattern by scanning the specific pattern.

In an electric vehicle wireless charging system in which a transmitter and a receiver are separated, a recognition rate with respect to various FOs is increased so that stability and stability of a wireless power transfer system can be secured.

The present disclosure can be utilized as an FOD technology in a system for transmitting power in a non-contact manner, such as a wireless charging system for electric vehicles and robots.

While the present disclosure have been described in detail with reference to exemplary embodiments, those skilled in the art can understand that the present disclosure can be implemented in other specific forms different from the content described herein without departing from the technical spirit or the necessary features of the present disclosure. Thus, it should be understood that the above-described embodiments are not restrictive but illustrative in all aspects. In addition, the scope of the present disclosure is defined by the appended claims rather than the detailed description, and it should be construed that all changes or modifications derived from the meaning and scope of the appended claims and the equivalents thereof fall within the technical scope of the present disclosure.

What is claimed is:

1. A pattern light laser-based foreign object detection (FOD) device in a wireless power transfer system including a power transmitter and a power receiver, the device comprising:

a laser module comprising:

a laser light source configured to emit a dot-shaped light, a first diffraction grating filter configured to convert the dot-shaped light into a first multi-line pattern, a second diffraction grating filter spaced apart from and aligned with the first diffraction grating filter, the second diffraction grating filter configured to convert the first multi-line pattern into a second multi-line pattern having more lines of light than the first multi-line pattern, and a window configured to transmit the second multi-line pattern to an object, wherein the second diffraction grating filter is disposed between the first diffraction grating filter and the window; and a detector spaced apart from the laser module and configured to receive a pattern light reflected from the object and detect a pattern image from the reflected pattern light.

2. The device of claim 1, wherein the detector comprises a detecting lens configured to receive the reflected pattern light, and wherein the detecting lens is horizontally spaced apart by a distance (E) from the window of the laser module such that the detector is angled with respect to the object.

3. The device of claim 2, wherein the detector is configured to determine a size (G) of the detected pattern image based on a relationship of $D/E=F/G$, and wherein D is a distance between the window of the laser module and the object, and F is a distance between the detecting lens and the pattern image in the detector.

* * * * *